US012379517B2

(12) United States Patent
Hegna

(10) Patent No.: US 12,379,517 B2
(45) Date of Patent: Aug. 5, 2025

(54) USING AMBIENT ACOUSTIC ENERGY AS A PASSIVE SOURCE IN MARINE SEISMIC SURVEYS

(71) Applicant: PGS Geophysical AS, Oslo (NO)

(72) Inventor: Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 418 days.

(21) Appl. No.: 17/739,628

(22) Filed: May 9, 2022

(65) Prior Publication Data

US 2022/0365237 A1 Nov. 17, 2022

Related U.S. Application Data

(60) Provisional application No. 63/187,276, filed on May 11, 2021, provisional application No. 63/187,243, filed on May 11, 2021.

(51) Int. Cl.
| | |
|---|---|
| *G06F 11/30* | (2006.01) |
| *G01V 1/30* | (2006.01) |
| *G01V 1/36* | (2006.01) |
| *G01V 1/38* | (2006.01) |
| *G01V 1/20* | (2006.01) |

(52) U.S. Cl.
CPC ............ *G01V 1/3808* (2013.01); *G01V 1/302* (2013.01); *G01V 1/364* (2013.01); *G01V 1/20* (2013.01); *G01V 2210/123* (2013.01)

(58) Field of Classification Search
CPC .................................................. G01V 1/3808
See application file for complete search history.

(56) References Cited

U.S. PATENT DOCUMENTS

| | | |
|---|---|---|
| 7,796,466 B2 | 9/2010 | Combee et al. |
| 8,208,342 B2 | 6/2012 | Kluever et al. |
| (Continued) | | |

FOREIGN PATENT DOCUMENTS

| | | | |
|---|---|---|---|
| GB | 2430260 | * | 3/2007 |
| GB | 2430260 A | | 3/2007 |
| (Continued) | | | |

OTHER PUBLICATIONS

Hegna, "Estimation of the Acoustic Wavefield generated by a seismic Vessel from Towed Streamer Data," SEG Technical Program Expanded Abstracts: 2011-2015 (SEG Sep. 1, 2021) (Year: 2021).*

(Continued)

*Primary Examiner* — Phuong Huynh

(57) ABSTRACT

Methods and apparatus are described for using ambient acoustic energy as a passive source in marine seismic surveys. An example embodiment includes (a) accessing signals that were recorded by sensors in the presence of acoustic energy that was emitted by a passive source during a marine seismic survey; (b) identifying a point to represent a location from which the acoustic energy was emitted; (c) isolating, from the recorded signals, a direct wavefield arriving at the sensors from a direction of the identified point; and (d) generating an estimated passive source wavefield at the identified point by backpropagating the isolated direct wavefield to the identified point. The estimated passive source wavefield may be used, together with signals recorded by the sensors, to generate an image of a subsurface earth volume without the use of active seismic sources.

50 Claims, 17 Drawing Sheets

(56) References Cited

U.S. PATENT DOCUMENTS

| | | |
|---|---|---|
| 8,456,950 B2 | 6/2013 | Hegna |
| 8,902,698 B2 | 12/2014 | Hegna et al. |
| 9,075,162 B2 | 7/2015 | Baardman et al. |
| 9,110,180 B2 | 8/2015 | Hegna et al. |
| 9,291,737 B2 | 3/2016 | Sollner et al. |
| 9,304,221 B2 | 4/2016 | Edme et al. |
| 9,360,575 B2 | 6/2016 | Etienne et al. |
| 9,453,930 B2 | 9/2016 | Whitmore et al. |
| 9,684,086 B2 | 6/2017 | Hegna et al. |
| 9,753,163 B2 | 9/2017 | Laws |
| 9,915,745 B2 | 3/2018 | Hegna et al. |
| 10,151,847 B2 | 12/2018 | van Groenestijn |
| 10,274,627 B2 | 4/2019 | Stewart et al. |
| 10,288,753 B2 | 5/2019 | Poole et al. |
| 10,359,526 B2 | 7/2019 | Ronholt et al. |
| 10,759,039 B2 | 10/2020 | Oukili et al. |
| 10,795,039 B2 | 10/2020 | Oukili et al. |
| 10,877,177 B2 | 12/2020 | Tshering et al. |
| 11,079,507 B2 | 8/2021 | Song et al. |
| 11,092,708 B2 | 8/2021 | Lu et al. |
| 11,092,710 B2 | 8/2021 | Hegna |
| 11,105,908 B2 | 8/2021 | Udengaard |
| 11,243,319 B2 | 2/2022 | Andersson et al. |
| 11,280,925 B2 | 3/2022 | Robertsson et al. |
| 11,333,781 B2 | 5/2022 | Fu |
| 11,422,277 B2 | 8/2022 | Fu |
| 11,914,090 B2 | 2/2024 | Orji et al. |
| 2013/0329520 A1 | 12/2013 | van Borselen |
| 2014/0200820 A1 | 7/2014 | El Yadari et al. |
| 2015/0063064 A1 | 3/2015 | van Groenestjin |
| 2020/0150302 A1* | 5/2020 | Song ..................... G01V 1/325 |
| 2020/0333490 A1 | 10/2020 | Tegna et al. |
| 2023/0129626 A1 | 4/2023 | Fu et al. |

FOREIGN PATENT DOCUMENTS

| | | |
|---|---|---|
| GB | 258 4285 A | 2/2020 |
| WO | 2019 087 011 A1 | 5/2019 |
| WO | 2021/055152 A1 | 3/2021 |
| WO | 2021/127372 A1 | 6/2021 |
| WO | WO 2021127372 * | 6/2021 |

OTHER PUBLICATIONS

Hegna, "Estimation of the Acoustic Wavefield Generated by a Seismic Vessel from Towed Streamer Data," SEG Technical Program Expanded Abstracts: 2011-2015 (SEG Sep. 1, 2021).

Search Report dated Oct. 31, 2022 in GB2206815.9 (3 pages).

Raghukumar, et al., "A Vector Sensor-Based Acoustic Characterization System for Marine Renewable Energy," J. Mar. Sci. Eng. 2020, vol. 8, p. 187 (MDPI 2020), 15 pages.

Felisberto, et al., "Combining Pressure and Particle Velocity Sensors for Seismic Processing," Oceans 2016 MTS/IEEE Monterey, 2016, pp. 1-6 (IEEE 2016), 6 pages.

Kim, et al., "Passive Source Localization Using Acoustic Intensity in Multipath-Dominant Shallow-Water Waveguide," Sensors 2021, vol. 21, p. 2198 (MDPI 2021), 13 pages.

Amundsen, "Elimination of Free-Surface Multiples Without Need of the Source Wavelet," Geophysics vol. 66, No. 1 (SEG 2001), 15 pages.

Hegna, et al., "Making the Transition from Discrete Shot Records to Continous Seismic Records and Source Wavefileds, and its Potential Impact on Survey Efficiency and Environmental Footprint," Geophysical Prospecting 2018 (EAGE), 14 pages.

Wapenaar, et al., "Seismic Interferometry: A Comparison of Approaches," SEG Int'l Exposition and 74th Annual Meeting (SEG 2004), 4 pages.

Whitmore, et al., "Imaging of Primaries and Multiples Using a Dual-Sensor Towed Streamer," SEG Denver 2010 Annual Meeting (SEG 2010), 7 pages.

Hegna, "Continuous Wavefields Method—The Acoustic Wavefield Generated by the Seismic Vessel," 82nd EAGE Annual Conference & Exhibition (EAGE 2021), 4 pages.

Kluever, et al., "Continuous Wavefields Method—Insights from a Shallow Water Field Trial," SEG Int'l Exposition and 90th Annual Meeting (SEG 2020), 5 pages.

Ziolkowski, et al., "The Signature of an Air Gun Array: Computation from Near-Field Measurements Including Interactions," Geophysics, vol. 47, No. 10 (SEG 1982), 9 pages.

Davies, et al., "Screw Seismic Sources," SEG Technical Program Expanded Abstracts: 710-711 (SEG 1992), 2 pages.

Hegna, "Imaging the Subsurface Using Acoustic Signals Generated by a Vessel," First Break, vol. 40: 47-53 (EAGE 2022).

Hegna, "The Acoustic Wavefield Generated by a Vessel Sailing on Top of a Streamer Spread," 83rd EAGE Annual Conference & Exhibition, Madrid (EAGE 2022), 5 pages.

Hegna, et al., "The Acoustic Wavefield Generated by a Vessel Sailing Over Ocean Bottom Cables," 84th EAGE Annual Conference & Exhibition, Vienna (EAGE 2023), 5 pages.

Hegna, "Using Uncontrolled Acoustic Energy in Combination with Controlled Seismic Source Energy to Retrieve Information About a Subsurface," U.S. Appl. No. 18/806,957, Filed Aug. 16, 2024.

* cited by examiner $$S_P(\omega, \tilde{\theta}) = \frac{P^{dir}(\omega)}{R^P_{sens}(\omega) \frac{1}{N} \sum_{n=1}^{N} \left[ \frac{e^{-i\omega r_n/c}}{r_n} + R \frac{e^{-i\omega r'_n/c}}{r'_n} \right]} \longleftarrow 1200$$

FIG. 12

$$S_v(\omega, \tilde{\theta}) = \frac{\rho c V_z^{dir}(\omega)}{R^{V_z}_{sens}(\omega) \frac{1}{N} \sum_{n=1}^{N} \left[ \cos(\theta_n) \frac{e^{-i\omega r_n/c}}{r_n} + \cos(\theta'_n) R \frac{e^{-i\omega r'_n/c}}{r'_n} \right]} \longleftarrow 1300$$

FIG. 13

$$S_v(\omega, \tilde{\theta}) = \frac{\rho c V_s^{dir}(\omega)}{R^{V_s}_{sens}(\omega) \frac{1}{N} \sum_{n=1}^{N} \left[ \frac{e^{-i\omega r/c}}{r_n} + \cos(\delta_n) R \frac{e^{-i\omega r'/c}}{r'_n} \right]} \longleftarrow 1400$$

FIG. 14

Original Sensor Channel Data

Sensor Channel Data after 10 Iterations

USING AMBIENT ACOUSTIC ENERGY AS A PASSIVE SOURCE IN MARINE SEISMIC SURVEYS

CROSS-REFERENCE TO RELATED APPLICATIONS

This application claims benefit to the filing dates of U.S. Provisional Application 63/187,243, filed on May 11, 2021, titled "Passive Imaging with Water Bottom Multicomponent Sensors," and of U.S. Provisional Application 63/187,276, filed on May 11, 2021, titled "Estimating Ship Noise with Multicomponent Streamers," both of which are hereby incorporated by reference as if fully set forth herein.

BACKGROUND

Marine seismic surveys are performed in bodies of water such as oceans or lakes to determine attributes of structures and materials disposed in earth volumes that lie beneath the water. In most marine seismic surveys, actively controlled seismic sources are used to produce acoustic energy that propagates through the water into the subsurface. Such actively-controlled seismic sources (hereinafter "active seismic sources" or simply "active sources") typically include one or more air guns, which use compressed air to produce a series of pressure impulses in the water, or one or more seismic marine vibrators, which are purpose-built devices that are towed in the water and are driven with controlled electrical signals to produce a series of pressure wave vibrations in the water—sometimes in accordance with a specially designed set of digital codes or frequency sweeps.

Because of differing acoustic impedances presented by strata in the subsurface, some of the acoustic energy emitted by the active sources is reflected from the subsurface. This reflected energy contains information about the structures and materials in the subsurface. For this reason, the reflected energy is recorded by seismic sensors that are placed in the water, or on the water bottom, or both. Visual or numeric representations of subsurface structures can then be created, based on the recorded seismic data, in a process known as "imaging."

To support the process of imaging when active seismic sources are in use, it is known to place hydrophones in close proximity to individual active source elements so that the near field wavefield emitted by the source elements may be recorded simultaneously with the reflected seismic energy that is recorded by the seismic sensors located elsewhere. The near field wavefield for a given active source element is recorded by placing hydrophones within one wavelength (the "near field") of the active source elements, for acoustic frequencies of interest. When such near field recordings are captured from the active seismic sources used in a survey, the source wavefield can be known with high accuracy. Using this information, imaging can then be performed according to known techniques by deconvolving the known source wavefield from the recorded seismic data to obtain the impulse response of the earth.

For various reasons, including reduced environmental impact and reduced cost, it would be desirable to be able to image a subsurface by using acoustic energy from non-active sources (i.e., by using ambient acoustic energy that is present in the marine environment in which a survey is conducted, rather than using energy generated by active sources such as air guns or seismic marine vibrators or the like). Ambient acoustic energy is often present during a marine seismic survey along with the energy that is produced by the active seismic sources. For example, ambient acoustic energy may be emitted by the engines or propellers of the survey vessel itself, or by those of other nearby vessels, or by non-vessel devices located in or near the survey area such as one or more windmills in an offshore windmill farm or one or more offshore drilling or production platforms. Other ambient acoustic energy sources are also possible. Any such sources of ambient acoustic energy that is present in a marine environment and that is not created by active seismic sources such as air guns or seismic marine vibrators will be referred to herein as "passive sources."

BRIEF DESCRIPTION OF THE DRAWINGS

FIG. 12 is an equation illustrating an example method for performing the passive source wavefield generation step of FIG. 9 using pressure data, in accordance with embodiments.

FIGS. 13 and 14 are equations illustrating example methods for performing the passive source wavefield generation step of FIG. 9 using velocity data, in accordance with embodiments.

DETAILED DESCRIPTION

Figure 1:
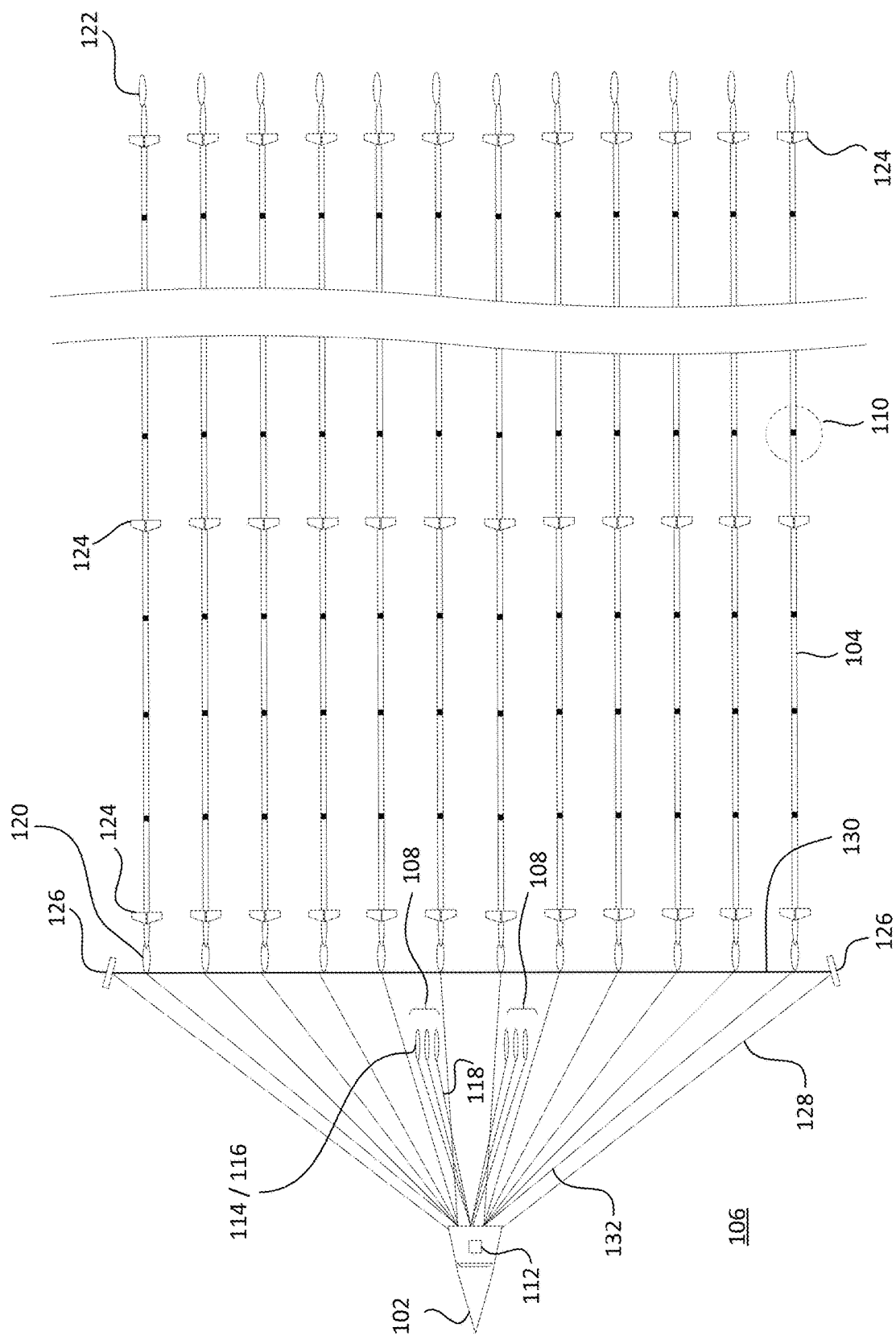
FIGS. 1 and 2 are top and side elevation views, respectively, of an example towed-streamer marine seismic survey system that employs active seismic sources.

Problems Associated with Imaging Using Passive Sources

Several problems have arisen in previous attempts to perform seismic imaging using energy from passive sources. Chief among them is the fact that, when passive source energy is used, there is no direct knowledge of the source wavefield. For example, there is no near field recording that can be deconvolved from recorded seismic data to obtain the earth response.

In one prior art attempt related specifically to using ship propeller noise as a passive source, an effort was made to create a near field recording of the passive source. Hydrophones were protruded through a vessel hull in close proximity to the vessel's propellers in an effort to record the near field wavefield emitted by the ship's propellers. See Davies, et al., "Screw Seismic Sources" (SEG Technical Program Expanded Abstracts, 1992). The attempt proved less than successful, in part because the hydrophone recordings failed to adequately characterize the directional characteristics of the source wavefield. This in turn was due, in part, to the limited number of hydrophones employed and their proximity to the vessel hull. Even if a better near field recording could have been obtained, however, the recording would have been limited to propeller noises emitted by a single vessel. Thus, the recording could not have been used to characterize a source wavefield emitted by other parts of the vessel, or by other passive sources in the marine environment.

Other techniques are available for use in attempting to image a subsurface without direct knowledge of the source wavefield, using only the seismic data recorded by sensors located in towed streamers or in ocean bottom nodes.

One such technique is seismic interferometry, which is based on cross-correlating numerous traces recorded in different positions in order to retrieve information about the subsurface. A survey of seismic interferometry techniques is provided in Wapenaar, et al., "Seismic Interferometry: A Comparison of Approaches" (SEG Technical Program Expanded Abstracts, 2004). Another such technique is up-down deconvolution as described in Amundsen, "Elimination of Free-Surface Related Multiples Without Need of the Source Wavelet" (Geophysics Vol. 66 No. 1, 2001). A third such technique is imaging with separated wavefields, as discussed in Whitmore, et al., "Imaging of Primaries and Multiples Using a Dual-Sensor Towed Streamer" (SEG Technical Program Expanded Abstracts, 2010). Each of these techniques may be referred to herein as a "direct wave technique," because each of them uses the recorded direct wave from the source to image the subsurface.

A problem that is common to all of the above-described direct wave techniques is that each of them relies on 1) capturing the direct, far field, wavefield of the source as the direct wavefield appears at the location of seismic sensors disposed in towed streamers or in ocean bottom nodes, and 2) using the direct wavefield as captured by those sensors to extract the earth response from the totality of the recorded data. These approaches thus require that the direct wavefield must be contained in the recorded data with a high degree of accuracy. In reality, however, the direct source wavefield is always only partially recorded during marine seismic surveys. This is due to the sparsity in the placement of the seismic sensors within the sensor grid and to the limited spatial extent of the sensor grid itself. Thus, using the recorded direct wavefield alone generally fails to achieve highly accurate imaging results.

A need therefore exists for improved techniques that can be employed in the context of imaging when using ambient acoustic energy as a passive source and without direct knowledge of the near field source wavefield.

Nomenclature

This disclosure describes multiple embodiments by way of example and illustration. It is intended that characteristics and features of all described embodiments may be combined in any manner consistent with the teachings, suggestions and objectives contained herein. Thus, phrases such as "in an embodiment," "in one embodiment," and the like, when used to describe embodiments in a particular context, are not intended to limit the described characteristics or features only to the embodiments appearing in that context.

The phrases "based on" or "based at least in part on" refer to one or more inputs that can be used directly or indirectly in making some determination or in performing some computation. Use of those phrases herein is not intended to foreclose using additional or other inputs in making the described determination or in performing the described computation. Rather, determinations or computations so described may be based either solely on the referenced inputs or on those inputs as well as others. The phrase "configured to" as used herein means that the referenced item, when operated, can perform the described function. In this sense an item can be "configured to" perform a function even when the item is not operating and is therefore not currently performing the function. Use of the phrase "configured to" herein does not necessarily mean that the described item has been modified in some way relative to a previous state. "Coupled" as used herein refers to a connection between items. Such a connection can be direct or can be indirect through connections with other intermediate items. Terms used herein such as "including," "comprising," and their variants, mean "including but not limited to." Articles of speech such as "a," "an," and "the" as used herein are intended to serve as singular as well as plural references except where the context clearly indicates otherwise.

Marine Seismic Surveys Generally

Figure 2:
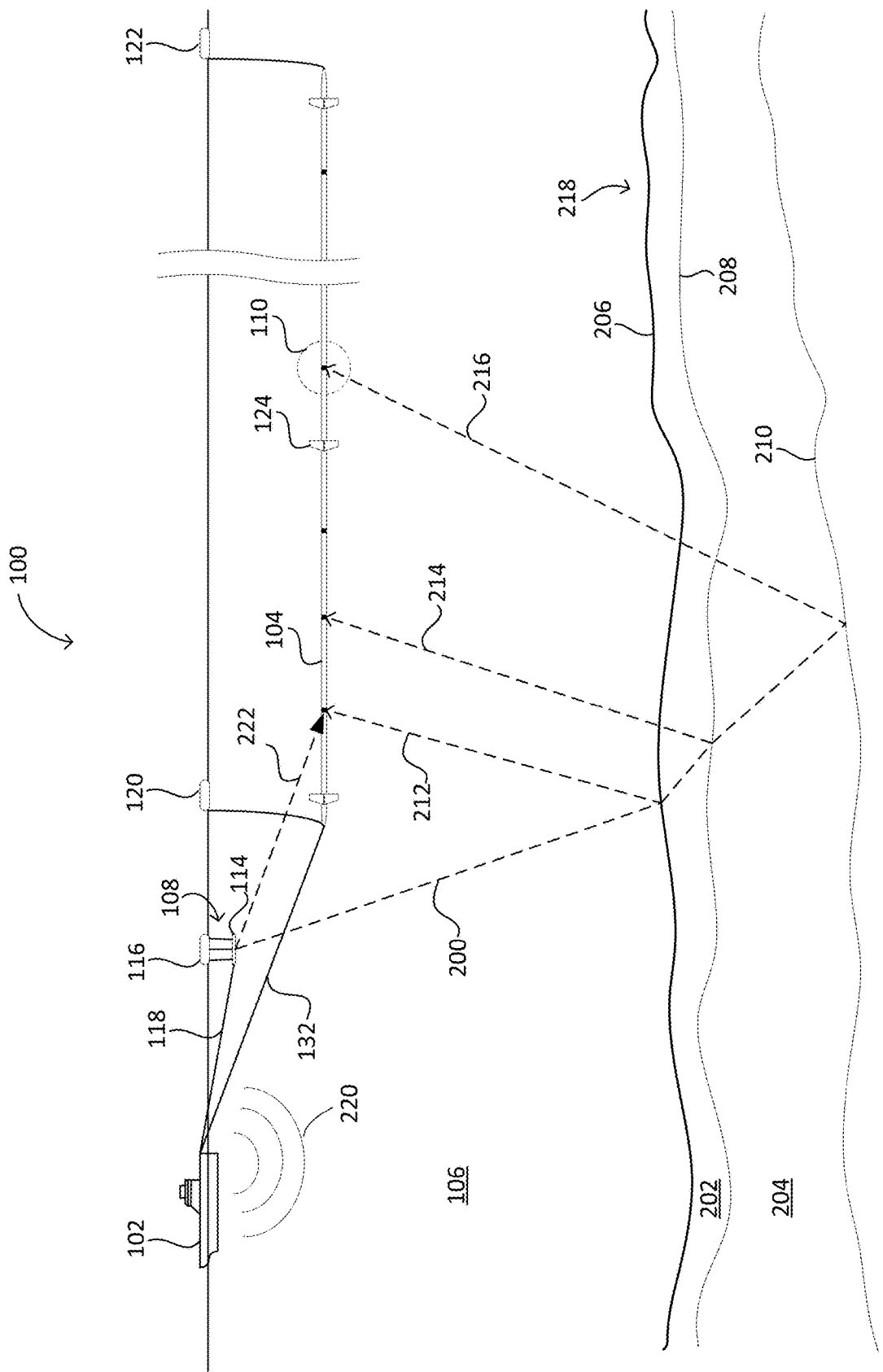

FIGS. 1 and 2 present top and side elevation views, respectively, of an example towed-streamer marine seismic survey system that employs active seismic sources. Survey system 100 is representative of a variety of similar geophysical survey systems in which a vessel 102 tows an array of elongate sensor streamers 104 in a body of water 106 such as an ocean, a sea, a bay, or a large lake. Typically the vessel is equipped with at least one global positioning system ("GPS") unit so that its location during the survey may be known and recorded for later use. Vessel 102 is shown towing twelve streamers 104 in the illustrated example. In other embodiments, any number of streamers may be towed, from as few as one streamer to as many as twenty or more. The terms "streamer" and "cable" as used herein should be interpreted to include any type of seismic sensor cable, and the two terms may be used interchangeably below.

During a typical marine seismic survey, one or more active seismic sources 108 are activated to produce acoustic energy 200 that propagates in body of water 106. Energy 200 penetrates various layers of sediment and rock 202, 204 underlying body of water 106. As it does so, it encounters interfaces 206, 208, 210 between materials having different physical characteristics, including different acoustic impedances. At each such interface, a portion of energy 200 is reflected upward while another portion of the energy is refracted downward and continues toward the next lower interface, as shown. Reflected energy 212, 214, 216 is detected by sensors 110 disposed at intervals along the lengths of streamers 104, along with a so-called direct wavefield that reaches the sensors via a path, such as path 222, that travels directly from the active sources 108 to the location of the sensors. In FIGS. 1 and 2, sensors 110 are indicated as black squares inside each of streamers 104. Sensors 110 produce signals corresponding to the reflected energy. These signals are collected and recorded by control equipment 112 located onboard vessel 102. The recorded signals may be processed and analyzed onboard vessel 102 and/or at one or more onshore data centers to produce images of structures within subsurface 218. These images can be useful, for example, in identifying possible locations of hydrocarbon reservoirs within subsurface 218.

Any number of active sources 108 may be used in a marine seismic survey. In the illustrated example, vessel 102 is shown towing two such sources. In other systems, different numbers of sources may be used, and the sources may be towed by other vessels, which vessels may or may not tow additional streamer arrays. Typically, an active source 108 includes one or more source subarrays 114, and each subarray 114 includes one or more acoustic emitters such as air guns or marine vibrators. Each subarray 114 may be suspended at a desired depth from a subarray float 116. Compressed air as well as electrical power and control signals may be communicated to each subarray via source umbilical cables 118. Data may be collected, also via source umbilical cables 118, from various sensors located on subarrays 114 and/or floats 116, such as acoustic transceivers and GPS units. Acoustic transceivers and GPS units so disposed help to accurately determine the positions of each subarray 114 during a survey. In some cases, subarrays 114 may be equipped with steering devices to better control their positions during the survey.

Streamers 104 are often very long, on the order of 5 to 10 kilometers, so usually are constructed by coupling numerous shorter streamer sections together. Each streamer 104 may be attached to a dilt float 120 at its proximal end (the end nearest vessel 102) and to a tail buoy 122 at its distal end (the end farthest from vessel 102). Dilt floats 120 and tail buoys 122 may be equipped with GPS units as well, to help determine the positions of each streamer 104 relative to an absolute frame of reference such as the earth. Each streamer 104 may in turn be equipped with acoustic transceivers and/or compass units to help determine their positions between GPS units and/or relative to one another. In many survey systems 100, streamers 104 include steering devices 124 attached at intervals, such as every 300 meters. Steering devices 124 typically provide one or more control surfaces to enable moving the streamer to a desired depth, or to a desired lateral position, or both. Paravanes 126 are shown coupled to vessel 102 via tow ropes 128. As the vessel tows the equipment, paravanes 126 provide opposing lateral forces that straighten a spreader rope 130, to which each of streamers 104 is attached at its proximal end. Spreader rope 130 helps to establish a desired crossline spacing between the proximal ends of the streamers. Power, control, and data communication pathways are housed within lead-in cables 132, which couple the sensors and control devices in each of streamers 104 to the control equipment 112 onboard vessel 102.

Collectively, the array of streamers 104 forms a sensor surface at which acoustic energy is received for recording by control equipment 112. In many instances, it is desirable for the streamers to be maintained in a straight and parallel configuration to provide a sensor surface that is generally flat, horizontal, and uniform. In other instances, an inclined and/or fan shaped receiving surface may be desired and may be implemented using control devices on the streamers such as those just described. Other array geometries may be implemented as well. Prevailing conditions in body of water 106 may cause the depths and lateral positions of streamers 104 to vary at times, of course. In various embodiments, streamers 104 need not all have the same length and need not all be towed at the same depth or with the same depth profile.

Sensors 110 within each streamer 104 may include one or more different sensor types such as pressure sensors (e.g., hydrophones) and/or motion sensors. Examples of motion sensors include velocity sensors (e.g., geophones) and acceleration sensors (e.g., accelerometers) such as micro-electromechanical system ("MEMS") devices. In general, pressure sensors provide a magnitude-only, or scalar, measurement. This is because pressure is not associated with a direction and is, therefore, a scalar quantity. Motion sensors such as velocity sensors and acceleration sensors, however, each provide a vector measurement that includes both a magnitude and, at least implicitly, a direction, as velocity and acceleration are both vector quantities. Velocity sensors and acceleration sensors each may be referred to herein as "motion sensors."

Figure 3:
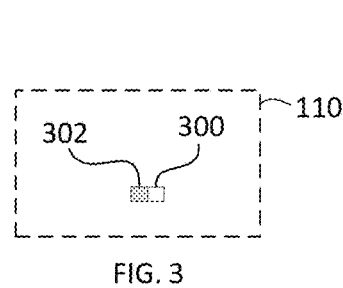
FIGS. 3, 4 and 5 are schematic diagrams illustrating a variety of different arrangements in which seismic sensors may be disposed within a towed streamer, or an ocean bottom cable, or an ocean bottom node, in accordance with embodiments.
Figure 4:
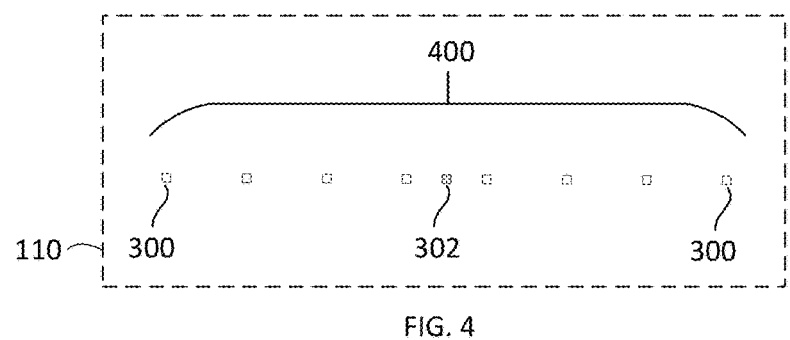
Figure 5:
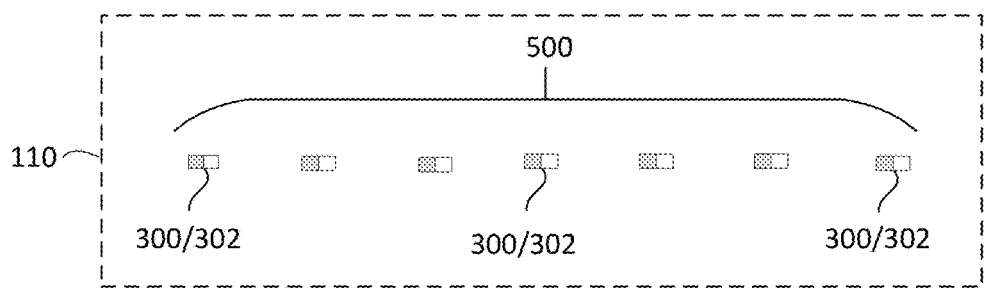

FIGS. 3, 4 and 5 illustrate several example arrangements consistent with embodiments for disposing sensors 110 in a streamer or cable 104 or in an ocean bottom node or an ocean bottom cable. In each illustration, pressure sensors are indicated with white squares, while motion sensors are indicated with shaded squares.

In the arrangement of FIG. 3, each sensor location 110 comprises a single pressure sensor 300 collocated with a single motion sensor 302. In the arrangement of FIG. 4, each sensor location 110 comprises a set of pressure sensors 300 forming a single pressure sensor group 400. A motion sensor 302 is disposed substantially at the center of pressure sensor group 400. (It is also possible to employ a similar arrangement in which a single pressure sensor is disposed among a group of motion sensors.) Typically, the signals generated by sensors forming a sensor group are combined or aggregated in some way, such as by summation and/or averaging. Such combination or aggregation may be accomplished in any suitable manner, such as in an analog domain using appropriate electrical coupling, or in a digital domain using digital data processing. In general, a sensor group may include any number of sensors and may comprise either pressure sensors or motion sensors. Normally, however, only measurements of the same type in a group (e.g., pressure, velocity, or acceleration) would be subject to combination or aggregation. Thus, in the particular arrangement illustrated in FIG. 4, the measurements of pressure sensors 300 may be combined or aggregated into a single signal, while the measurements of motion sensor 302 would be preserved as a separate signal. In the arrangement of FIG. 5, each sensor location 110 comprises a group 500 of collocated pressure sensors 300 and motion sensors 302. In the latter arrangement, one aggregated signal can be generated from the pressure sensors in the group, while another aggregated signal can be generated from the motion sensors in the group. Various other permutations of the arrangements of FIGS. 3, 4 and 5 are also possible. For example, any of these arrangements may comprise pressure sensors only or motion sensors only.

Marine Seismic Surveys Using Passive Sources

Figure 6:
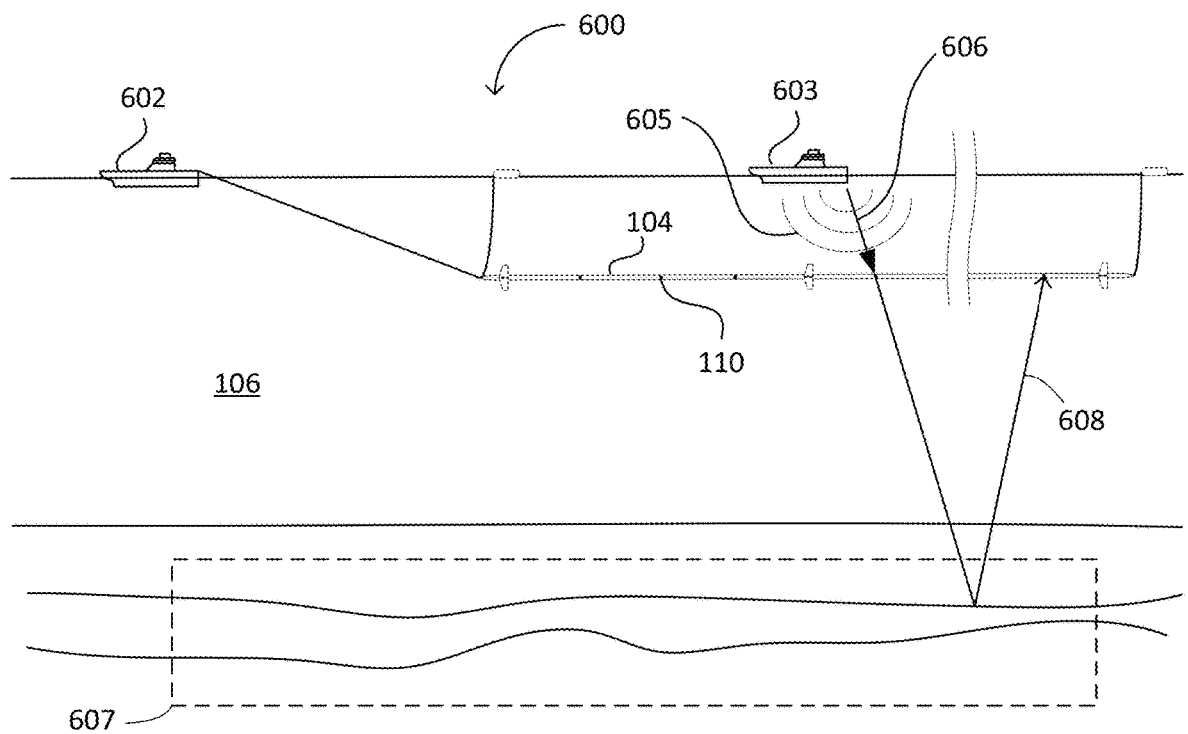
FIG. 6 is a side view illustrating an example configuration for performing a marine seismic survey using passive acoustic energy in conjunction with towed streamers, in accordance with embodiments.

FIG. 6 is a side view of an example towed streamer marine seismic survey system 600 that employs passive source energy in accordance with some embodiments. In the illustrated example, a first vessel 602 tows a spread of streamers 104, while a second vessel 603 sails over the top of the streamer spread. Acoustic energy 605 from the second vessel is emitted into the body of water 106 and may be used as a passive source to generate an image of a subsurface earth volume such as volume 607. For example, a representative direct wavefield path from the passive source to the sensors is illustrated at 606, and a representative reflected wavefield path is illustrated at 608. In other embodiments, acoustic energy from vessel 602 may be used as a passive source—either in addition to or in lieu of the acoustic energy from vessel 603—and the number of vessels and their locations relative to the streamer spread may differ from the arrangements illustrated. Each of streamers 104 and sensors 110 may take any suitable form such as, for example, any of the forms described above.

Figure 7:
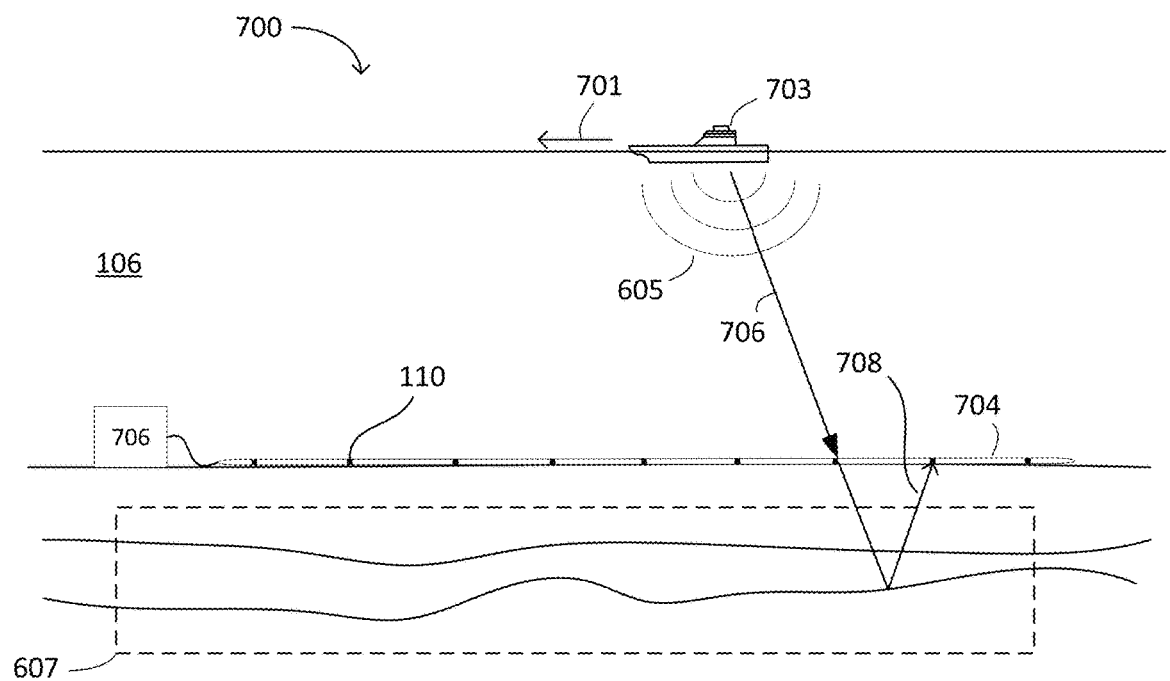
FIG. 7 is a side view illustrating an example configuration for performing a marine seismic survey using passive acoustic energy in conjunction with ocean bottom cables, in accordance with embodiments.

FIG. 7 is a side view of an example ocean bottom cable marine seismic survey system 700 that employs passive source energy in accordance with some embodiments. In the illustrated example, a passive source vessel 703 sails (e.g., in direction 701) over the top of, or in the vicinity of, one or more ocean bottom cables 704 that are disposed on the bottom of body of water 106. As in the example of FIG. 6, acoustic energy 605 is emitted from the vessel into the body of water and may be used as a passive source to generate an image of a subsurface earth volume such as volume 607. Also as in the example of FIG. 6, a representative direct wavefield path from the passive source to the sensors is illustrated at 706, and a representative reflected wavefield path is illustrated at 708. Sensors 110 may be contained within, and may be distributed along the length of, cables 704. Each of sensors 110 may take any suitable form such as, for example, any of the forms described above. If desired, one or more control hubs 706 may be provided to perform functions such as recording signals from the sensors that are disposed in cables 704.

Figure 8:
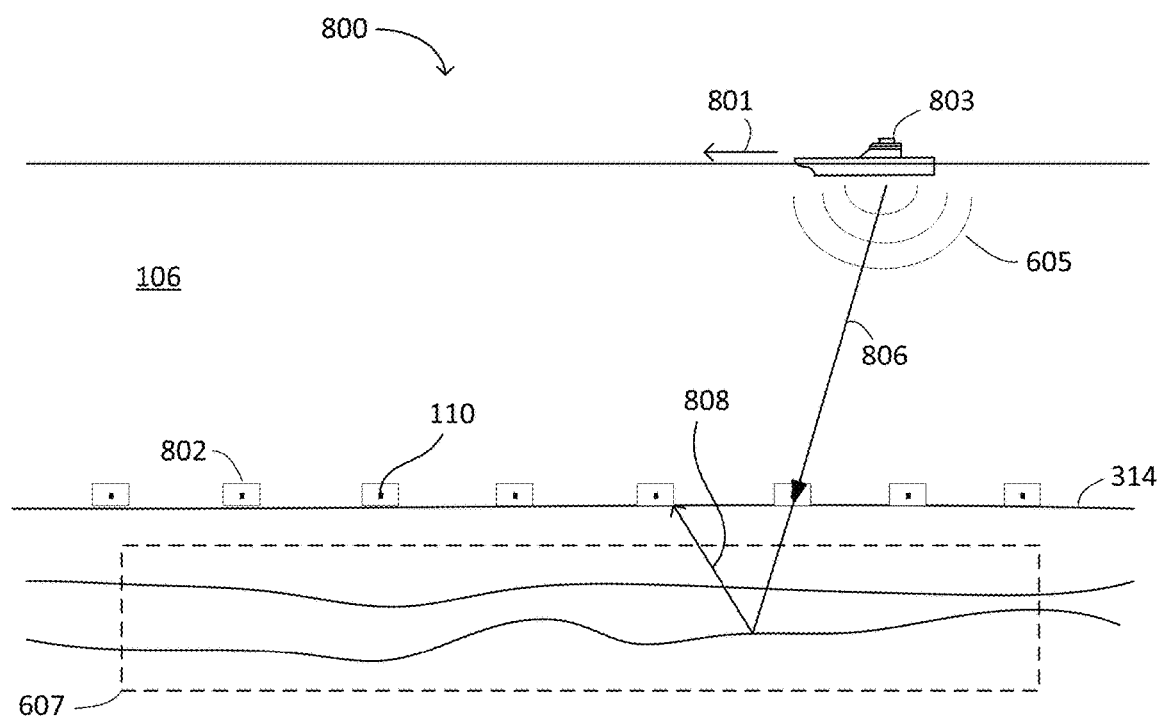
FIG. 8 is a side view illustrating an example configuration for performing a marine seismic survey using passive acoustic energy in conjunction with ocean bottom nodes, in accordance with embodiments.

FIG. 8 is a side view of an example ocean bottom node marine seismic survey system 800 that employs passive source energy in accordance with some embodiments. In the illustrated example, a passive source vessel 803 sails (e.g., in direction 801) over the top of, or in the vicinity of, an array of ocean bottom nodes 802 that are disposed on the bottom of body of water 106. As in the example of FIG. 6, acoustic energy 605 is emitted from the vessel into the body of water and may be used as a passive source to generate an image of a subsurface earth volume such as volume 607. Also as in the example of FIG. 6, a representative direct wavefield path from the passive source to the sensors is illustrated at 806, and a representative reflected wavefield path is illustrated at 808. Each of the nodes may contain one or more sensors 110. Each of sensors 110 may take any suitable form such as, for example, any of the forms described above. Each node may also contain recording equipment to record signals from the sensors disposed therein. Such recorded signals may be retrieved using any suitable technique, such as by retrieving the nodes and downloading the recorded signals.

The embodiments of FIGS. 6-8 are show by way of example and not by way of limitation. In these embodiments and others, other types of passive sources may be used, and the locations of the passive sources may differ from the arrangements illustrated. For example, acoustic energy from other passive sources such as windmills or drilling or production platforms may be used in these or other embodiments. In cases where the passive source corresponds to one or more vessels, acoustic energy from any type of vessel may be used, including vessels that are not associated with a survey. For example, acoustic energy from a supply vessel that happens to sail in the vicinity of an installation of ocean bottom nodes may be used to image a subsurface volume from data recorded by the nodes responsive to the acoustic energy emitted by the supply vessel. Moreover, any one of the above-described embodiments may be used in combination with one or more of the others. A towed streamer passive source survey system 600 may be used, for example, in conjunction with either or both of an ocean bottom cable survey system 700 or an ocean bottom node survey system 800.

Methods for Generating an Image Using Passive Source Energy

Figure 9:
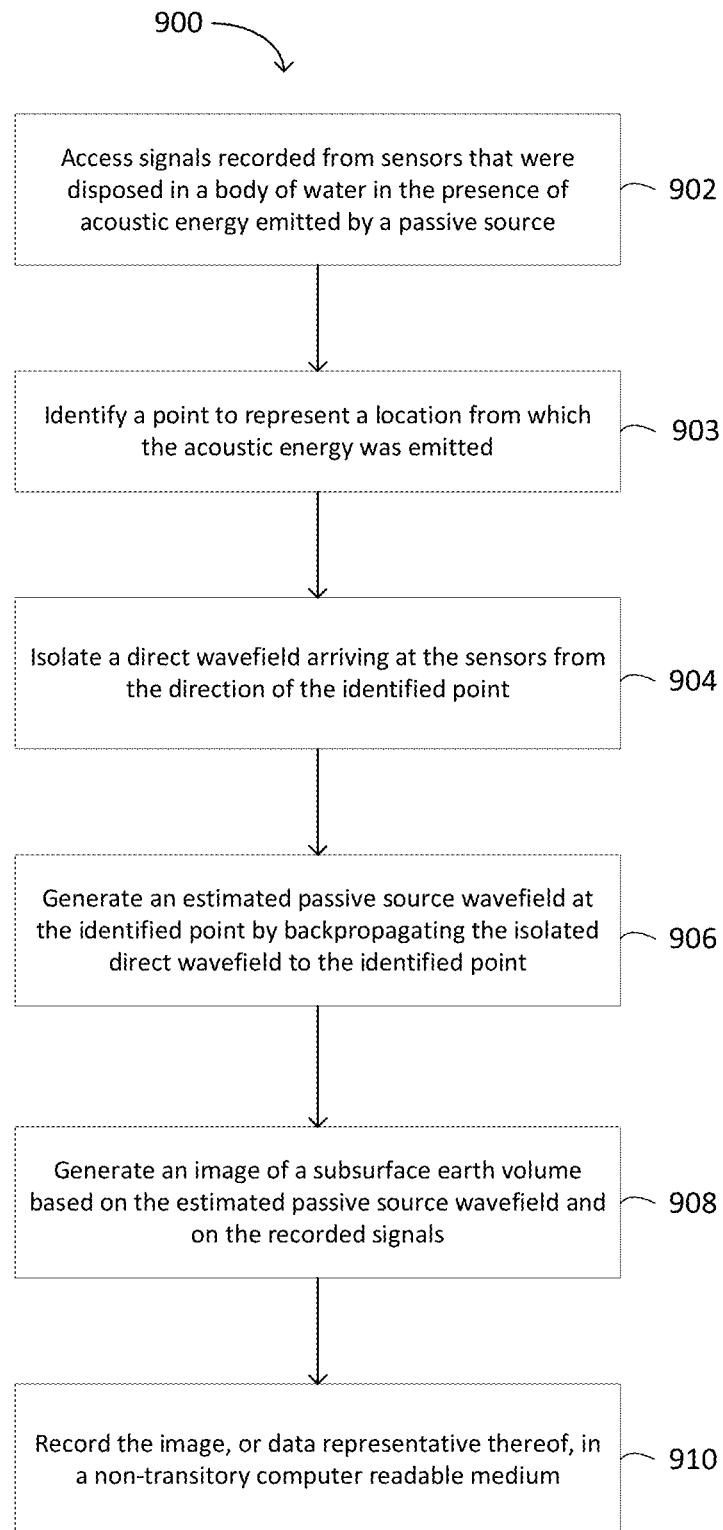
FIG. 9 is a flow diagram illustrating an example method for generating an image of a subsurface earth volume using ambient acoustic energy as a passive source, in accordance with embodiments.

FIG. 9 generally illustrates a class of methods 900 that may be used to generate an image of a subsurface earth volume, such as volume 607, by using passive acoustic energy, such as acoustic energy 605. The methods begin with accessing, at step 902, signals recorded from sensors that were disposed in a body of water in the presence of acoustic energy that was emitted in the body of water by a passive source. The passive source, and the survey arrangement during which the signals were recorded, may take a variety of forms including, for example, any of the forms described above. In step 903, a point is identified to represent a location from which the acoustic energy was emitted. (Several methods will be discussed further below for identifying such a point.) In step 904, a direct wavefield arriving at the sensors from the direction of the identified point (i.e., from a presumed location of the passive source) is isolated from the signals that were recorded from the sensors. In step 906, the isolated direct wavefield is backpropagated to the identified point to generate an estimated passive source wavefield at the identified point. In step 908, an image of a subsurface volume may be generated based on the estimated passive source wavefield and the signals that were recorded by the sensors. In step 910, the image or data representative of the image may be recorded in a non-transitory computer readable medium such as any of those to be described below.

Presumed Location of the Passive Source: The point identified in step 903 serves as a presumed location for a point source of passive acoustic energy. For this reason, the phrase "presumed location of a passive source" as used herein refers to a point in space from which acoustic energy from a passive source is emitted into the marine environment of a survey. In this sense the phrase "presumed location of a passive source" refers to the location of an omnidirectional point source of passive acoustic energy. The inventor hereof has observed, however, that a single physical source of passive acoustic energy may correspond to more than one such location. For example, in some embodiments, a physical source of passive acoustic energy (i.e., a passive source) may be modeled as a single point source, in which case the passive source corresponds to a single presumed location—that of the point source. In other embodiments, a passive source may be modeled as a superposition of multiple point sources, in which case the passive source corresponds to multiple such presumed locations—one location for each of the point sources used to model it. Moreover, the presumed location or locations corresponding to a passive source may change over time. Hence, a single physical passive source may correspond to one or more such presumed locations at any one time, and these locations may themselves change as a function of time.

Thus a single physical source of acoustic energy—such as a single vessel—may be modeled either as a single point source or as multiple point sources. Similarly, each of multiple physical sources of acoustic energy—such as each windmill in a collection of windmills or each drilling platform in a collection of drilling platforms—may be modeled as a single point source or as multiple point sources. In turn, the collections themselves may be modeled as a composition of the individual models representing the individual members of the collection.

In some embodiments, a presumed location of a passive source—and thus the point identified in step 903—may be chosen based on information that is known about a survey. For example, the point may be chosen to correspond to a location on or near a physical source of passive acoustic energy, such as a vessel or a drilling rig, that was present the body of water during the marine seismic survey. In other embodiments, one or more such points may be identified from the recorded survey data itself, using methods to be further described below. Several examples will now be provided to illustrate these concepts.

Choosing a Point Source Location Based on Information Known About a Survey: For all marine seismic surveys, detailed information is kept describing both the equipment configuration that was used to perform the survey and the vicinity in which the survey was performed. Detailed information is also usually available describing the attributes of the survey vicinity itself—for example, the types and locations of offshore installations that existed in the vicinity where the survey was performed. Consequently, for most marine seismic surveys, it will be straightforward to identify one or more likely physical sources of ambient acoustic energy that may be used as a passive source for seismic imaging, simply by having reference to the aforementioned information about the survey and the vicinity in which the survey was performed. Moreover, for most such surveys, the locations of the one or more likely sources of acoustic energy—and thus the likely locations of the one or more passive sources—will be known with reasonably high accuracy.

As a first example, a single physical source of acoustic energy may be modeled as a single point source, and the location of the point source may be chosen based on information known about the survey. Note that the locations of all vessels used in any marine seismic survey are recorded with high accuracy during the survey by recording the locations that were reported by GPS units aboard the vessels while the survey was performed. In these circumstances, a presumed location of the passive source may correspond to a single point chosen on or near one of the vessels used during the survey, such as a point on or near the stern of the vessel where the propellers of the vessel were located. (Cavitation associated with moving propellers is often a source of ambient acoustic energy in a body of water in which a survey is performed.) In such a case, methods in accordance with method 900 may be performed using the chosen point as the presumed location of the passive source.

As a second example, multiple physical sources of acoustic energy may be modeled separately as distinct point sources, and the locations of the respective point sources may be chosen based on information about the vicinity in which the survey was performed. Note that the locations of offshore installations in the vicinity of a survey can be known with high accuracy by having reference to map data that reports their locations. In these circumstances, a presumed location of a passive source may correspond to a single point chosen on or near one of the offshore installations. If desired, more than one such point may be chosen, wherein each chosen point corresponds to a different offshore installation. In the latter case, methods in accordance with method 900 may be performed for each of the chosen points separately, wherein each chosen point is used separately as the presumed location of a respective passive source.

Identifying One or More Point Source Locations by Using the Recorded Survey Data Itself: In either of the first and second examples, and in other cases, it may be desirable to model a single physical source of acoustic energy (i.e., an individual vessel or an individual windmill) as a composition of multiple point sources. In such cases, a scanning technique to be further described below may be used to identify the locations of multiple point sources corresponding to the single vessel or to the single windmill. To do so, a region of space may be defined to contain many points and the recorded survey data itself may be used to identify one or more individual point sources within the defined region of space.

The latter technique may also be applied when the location of the physical source or sources of ambient acoustic energy is not known (e.g., when the physical sources are moving objects, such as third-party fishing vessels, for which no GPS information is available). In such cases, the same scanning technique may be applied over a much larger region of space, and one or more point source locations may be identified within the larger region by using the recorded survey data itself to locate and to characterize the point sources.

Isolating the Direct Wavefield

Example methods will now be described for performing step 904, in which a direct wavefield arriving at the sensors from the direction of a presumed location of a passive source is isolated from the signals recorded by the sensors.

In each of the survey systems described above, sensor signals may be recorded in multiple sensor channels—at least one channel for each of the sensors or sensor groups that were employed during the survey. For example, each of sensor locations 110 described above would typically correspond to at least one sensor channel recording. A sensor location 110 that includes both a pressure sensor and a motion sensor would correspond to two sensor channel recordings—one for the pressure sensor and one for the motion sensor. Each such sensor channel recording would be associated with the location of the sensor or sensor group 110 that produced the signals recorded. For sensor locations 110 that include one or more groups of sensors, such as a group of motion sensors and/or a group of pressure sensors, typically one sensor channel recording would be made each sensor group type. If desired, however, separate channel recordings may be made for each individual sensor in a group of sensors that correspond to a single sensor location 110.

Figure 10:
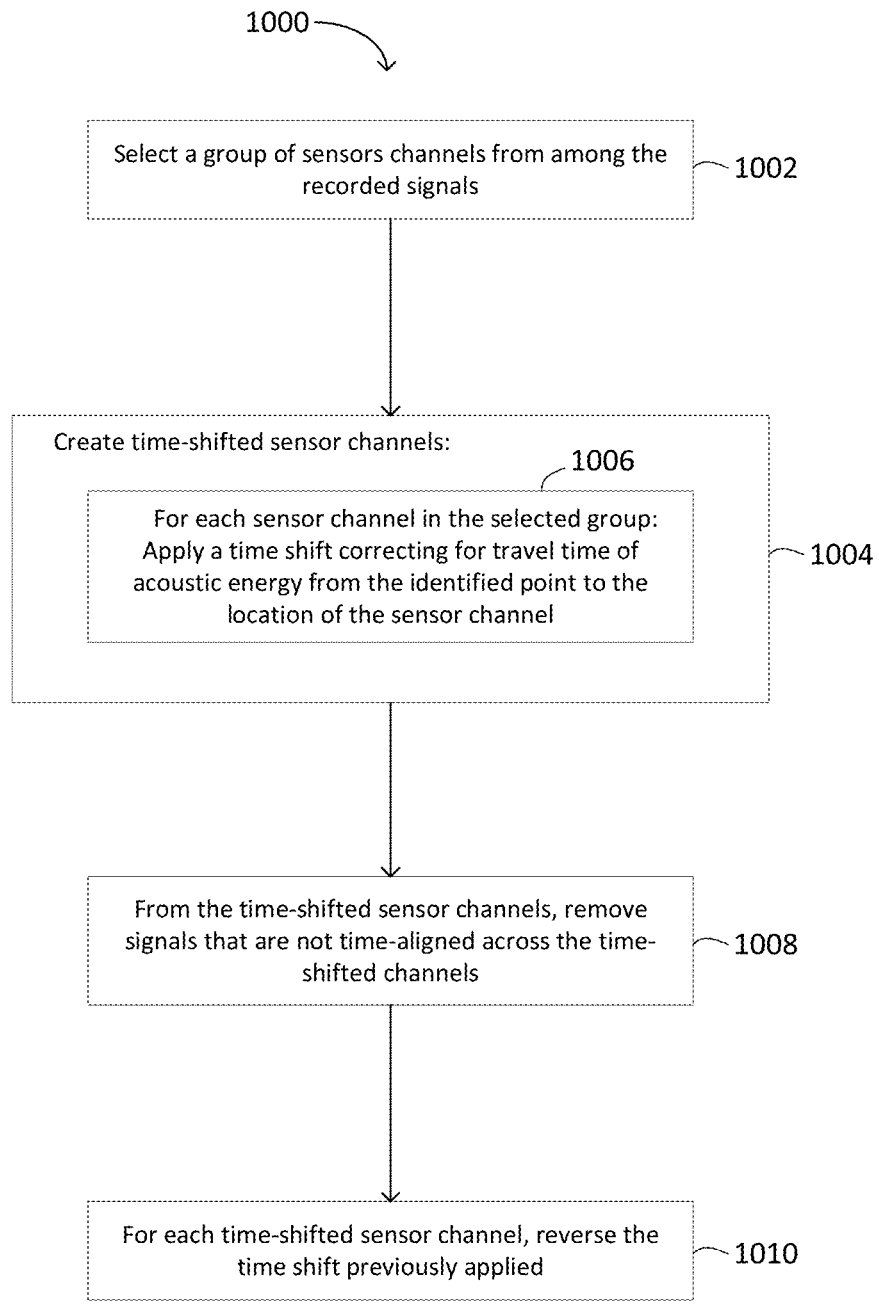
FIG. 10 is a flow diagram illustrating an example method for performing the direct wavefield isolation step of FIG. 9, in accordance with embodiments.

A procedure such as procedure 1000 illustrated in FIG. 10 may be used to isolate the direct wavefield using such sensor channel recordings. Referring now to FIG. 10 at step 1002, a group of the sensor channels may be selected from among the sensor channel recordings obtained during the survey. In some embodiments, the selected group may comprise all of the sensor channel recordings obtained during the survey. In other embodiments, the selected group may comprise a proper subset of the sensor channel recordings obtained such that the sensor channels included in the subset are those that exhibit a higher-amplitude direct wave response than do sensor channels that are not included in the subset. In one class of such embodiments, sensor channels included in the group may correspond to sensor locations 110 that were disposed within a predetermined distance closest to the presumed location of the passive source.

From the selected group of sensor channel recordings, a set of time shifted sensor channel recordings may be generated in step 1004. As indicated at step 1006, this may be accomplished by applying, to each sensor channel in the selected group, a time shift that corrects for travel time of acoustic energy from the presumed location of the passive source (the point or points identified in step 903) to the location of the respective sensor channel 110. Step 1006 may be accomplished with conventional techniques using the known locations for each sensor channel 110, the known location of the identified point, and the known velocity of sound in the body of water.

If there is relative movement between the location of the passive source and the locations of the sensors, then it may be desirable to compute travel times separately for each time sample of recorded data under consideration. Moreover, the time it takes for a direct wavefield to propagate from a source location to a receiver location is dependent upon the x,y,z position of the source at the time when the signal was emitted and the x,y,z location of the receiver at the time when the signal was received. Thus, in the case of a moving receiver for example, it is straightforward to determine the travel time from the source to the location the receiver occupied when the acoustic energy was emitted from the source, but some iteration may be required to determine the travel time of the same acoustic energy from the source to the location the receiver occupied when the acoustic energy reached the receiver. Such iterations may be performed according to known techniques. For example, in a first iteration, a travel time $t_{mn}$ may be computed from a source m to a receiver n assuming the receiver was not moving (i.e., assuming the receiver was in the same location when the energy was received as when the energy was emitted at time t). In a second iteration, $t_{mn}$ from the first iteration may be used to derive the position of the receiver at a time $t+t_{mn}$ and a new travel time $t_{mn}$ computed for that position of the receiver. In the following iterations, $t_{mn}$ from the previous iteration may be used to derive the position of the receiver at the time when the acoustic energy was received. The iterations continue until there is a minimal change in $t_{mn}$ from one iteration to the next. In most cases, such iterations converge quickly.

After appropriate time shifts have been applied to each of the sensor channel recordings in the selected group, direct arrival events in the time shifted signals will be time aligned, while other events will either not be time aligned or will be time aligned to a significantly lesser degree. In step 1008, signals that are not time aligned are removed from the time-shifted sensor channels. The removal of the non-time-aligned signals may be accomplished in a variety of ways. For example, they may be removed by applying a low pass filter to the time-shifted sensor channel recordings in the horizontal wavenumber domain. The parameters for, and implementation of, such a filter are within the capabilities of persons having skill in the art and will vary depending on factors such as the receiver side acquisition configuration that was used during the marine seismic survey. In an example embodiment, the low pass wavenumber limit for such a filter may be at least 0.25 of the Nyquist wavenumber for the given acquisition configuration. If the receiver side aperture is large enough, using this limit would achieve the result that all of the signals associated with the direct wave that have been time aligned would be preserved by the filter, and 75% of the other signals (i.e., reflected and/or refracted signals) would be attenuated by the filter. In practice, it is likely that some signals that are not associated with the direct wave will nevertheless not be filtered from the isolated direct wave. This, in turn, will cause some errors in the estimate of the acoustic wavefield generated by the passive source. The latter issue may be addressed by improving spatial distribution on the receiver side. Doing so will improve the isolation of the direct wavefield by the filter, which will in turn reduce errors in the estimated passive source wavefield.

Finally, in step 1010, the time shifts that were previously applied to the sensor channels in step 1004 are reversed so that the now-isolated direct wave appears in the selected sensor channels at the correct times. The result of step 1010 is a group of sensor channel recordings in which the direct wavefield originating from the presumed location of the passive source has been isolated.

Procedure 1000 may be applied to recorded pressure signals (e.g., signals recorded from hydrophone channels) to isolate the direct pressure wavefield at the location of the corresponding pressure sensors. Procedure 1000 may also be applied to recorded velocity signals to isolate the direct velocity wavefield at the location of the corresponding motion sensors. Examples of velocity signals are signals from velocity sensor channels, or signals from accelerometer channels that have been integrated to convert them into velocity signals. If desired, procedure 1000 may be applied to both types of signals.

Vector Rotations for Multi-Axis Velocity Signals: Because velocity signals are vector signals (i.e., they have a direction as well as a magnitude), an additional technique may be applied, if desired, while isolating the direct wave in cases where multi-axis velocity signals were recorded during the survey. Provided the location of the passive source is known, and provided the orientation of each multi-axis motion sensor channel is known or can be determined, one or more vector rotations may be applied to the multi-axis motion sensor channels to transform their magnitude values into transformed magnitude values. The transformed magnitude values are those that point directly toward the location of the passive source, irrespective of the actual orientation of the corresponding motion sensors during the survey. These rotations may be performed prior to, or in conjunction with, performing step 904.

To do so, and assuming a reference Cartesian coordinate system X, Y, Z, one or more the following transformations may be used as appropriate to the given application, $$R(\theta_x) = \begin{bmatrix} 1 & 0 & 0 \\ 0 & \cos\theta_x & -\sin\theta_x \\ 0 & \sin\theta_x & \cos\theta_x \end{bmatrix} \quad (1)$$

-continued $$R(\theta_y) = \begin{bmatrix} \cos\theta_y & 0 & \sin\theta_y \\ 0 & 1 & 0 \\ -\sin\theta_y & 0 & \cos\theta_y \end{bmatrix} \quad (2)$$

$$R(\theta_z) = \begin{bmatrix} \cos\theta_z & -\sin\theta_z & 0 \\ \sin\theta_z & \cos\theta_z & 0 \\ 0 & 0 & 1 \end{bmatrix} \quad (3)$$

where transformation 1 applies a clockwise rotation of $\theta x$ about the X axis, transformation 2 applies a clockwise rotation of $\theta y$ about the Y axis, and transformation 3 applies a clockwise rotation of $\theta z$ about the Z axis. By way of example, assume the signals recorded from a three-axis accelerometer channel during a survey are Ax(t), Ay(t) and Az(t), where the coordinate system x, y and z corresponds to the orientation of the accelerometer when the signals were recorded. Next assume a transformed coordinate system X, Y, Z having its origin at the location of the accelerometer but aligned with a direction from the accelerometer to the location of the passive source. Finally assume that coordinate system X, Y, Z differs from coordinate system x, y, z by angles $\theta x$, $\theta y$, and $\theta z$. A transformed set of magnitudes for the accelerometer channel may be computed as follows:

$$\acute{A}_x(t) = A_x(t)\cos\theta_y \cos\theta_z - A_y(t)\sin\theta_z + A_z(t)\sin\theta_y \quad (4)$$

$$\acute{A}_y(t) = A_x(t)\sin\theta_z + A_y(t)\cos\theta_z \quad (5)$$

$$\acute{A}_z(t) = A_z(t)\cos\theta_y - A_x(t)\sin\theta_y \quad (6)$$

where $\acute{A}_x(t)$, $\acute{A}_y(t)$ and $\acute{A}_z(t)$ are the magnitudes of the accelerometer channel after transformation to the X, Y, Z coordinate system. In general, with appropriate choices for the coordinate system X, Y, Z, and corresponding choices for the transformations 4, 5 or 6 applied to a motion sensor channel, any one of the three quantities can be made to represent the magnitude of the motion sensor in a direction pointing directly toward the location of the passive source.

Backpropagating the Isolated Direct Wavefield

Example methods will now be described for performing step 906, in which a passive source wavefield at the presumed location of the passive source is estimated by backpropagating the isolated direct wavefield from step 904 to the presumed location of the passive source. Step 906 may be accomplished by backpropagating pressure signals, or by backpropagating velocity signals, or both. Each technique will be described further below.

Figure 11:
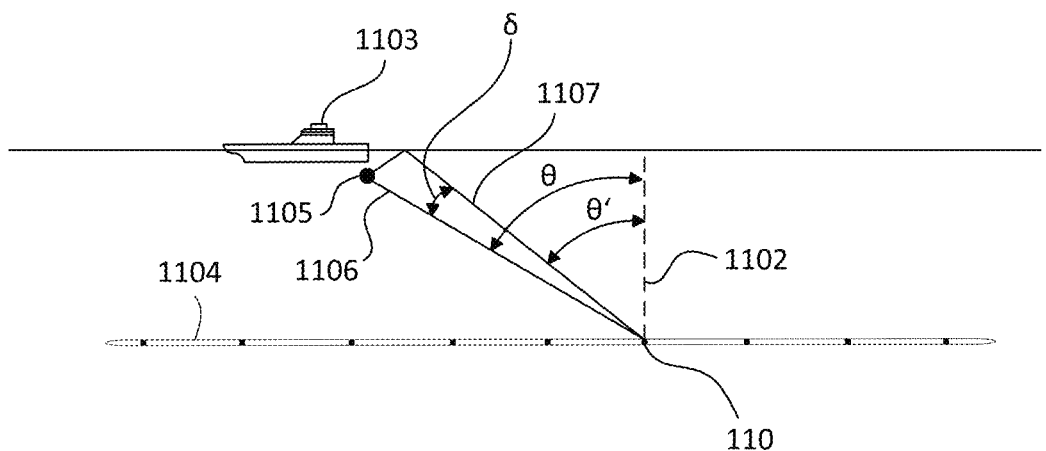
FIG. 11 is a side view schematically illustrating several spatial relationships relevant to the methods of FIGS. 9 and 10.

To support the discussion of these techniques, it will be helpful to first establish labels denoting some of the spatial relationships that are involved in the backpropagation procedures. FIG. 11 is a side view schematically illustrating such relationships.

Referring now to FIG. 11, a dark circle 1105 is used to denote a presumed location for a passive source. In the illustrated example, the source is presumed to be located at a point near the stern of a vessel 1103 (i.e., in the area of the vessel where propulsion devices are located) for the sake of explanation. Actual embodiments are not so limited. Several sensors 110 are shown disposed in a body of water at a depth below the vessel. The sensors may be disposed inside a streamer or ocean bottom cable 1104, or they may be disposed within ocean bottom nodes, as was generally described above. For a given one of the sensor locations 110, the symbol $\theta$ will be used herein to denote the angle between the vertical, 1102, and a ray path 1106 drawn directly from the presumed source location 1105 to the location of the sensor, as shown. The length of the direct ray path 1106 will be denoted r. The symbol $\theta'$ will be used herein to denote the angle between the vertical, 1102, and a surface-reflected ray path 1107 drawn from the presumed source location 1105 to the location of the sensor via the sea surface, also as shown. The length of the surface-reflected ray path 1107 will be denoted r'. The symbol $\bar{\theta}$ will be used herein to denote the average of $\theta$ and $\theta'$. The symbol $\delta$ will be used to denote the angular difference between the directions of ray paths 1106 and 1107.

Noted that the distances r and r' should be computed based on the source location at the time when a signal was emitted by the source and the receiver location at a time when the signal was received by the receiver. Techniques for computing such distances in the cases where there is relative movement between source and receiver are described above in relation to FIG. 10.

Backpropagating with Pressure Signals: The source wavefield of acoustic energy emitted from the presumed location of the passive source in the direction toward a given pressure sensor or pressure sensor group can be estimated, as a function of angular frequency $\omega$, from the isolated direct pressure wavefield of step 904 using equation 1200, which equation is shown in FIG. 12. In equation 1200, $p^{dir}(\omega)$ is the isolated direct pressure wavefield (from step 904) as recorded by a particular pressure sensor or pressure sensor group, $R_{sens}^{P}(\omega)$ is the response of the same pressure sensor or pressure sensor group, R is the reflection coefficient at the sea surface (which is normally close to −1), r and r' have the definitions described above, and c is the velocity of sound in the body of water. In the case of a pressure sensor location 110 that includes only a single pressure sensor, then N in the denominator would be set equal to 1. If, however, the pressure sensor location 110 under consideration contains a group of pressure sensors (for example, as in the arrangement of FIG. 4 or 5), then N would be set equal to the number of pressure sensors in the group that corresponds to location 110, and correspondingly different r and r' values would be applied in the summation shown in the denominator—one set of r and r' values for each of the N pressure sensors. In the latter case, a single $P^{dir}(\omega)$ value and a single $R_{sens}^{P}(\omega)$ value may be applied for the group of pressure sensors. Doing so may be appropriate, for example, where the signals from the pressure sensors in the group have been aggregated into a single channel as was described above. If, however, different values of $R_{sens}^{P}(\omega)$ are known for each of the pressure sensors in the sensor group, then equation 1200 may be revised accordingly to take the different values into the summation. In any of these cases, the result of applying equation 1200 to the isolated direct pressure wavefield for a single pressure sensor location 110 will be an estimate of the passive source wavefield emitted at the location of the passive source in the direction toward the pressure sensor location 110.

Backpropagating with Velocity Signals: At least two techniques may be used to generate an estimate of the source wavefield of acoustic energy emitted from the presumed location of the passive source in the direction toward a given motion sensor or motion sensor group 110. A first technique is to do so using velocity signals from motion sensors that were oriented vertically (i.e., in direction 1102) during the survey. This technique may be appropriate, for example, in cases where only single-axis motion sensors were employed during the survey, as sometimes happens in towed streamer surveys. This technique may also be used, however, when multi-axis motion sensor signals were employed in the survey. A second technique may be applied when multi-axis motion sensor signals are available and the vector rotations described above have been applied to obtain the isolated direct wavefield using vector signals that point directly toward the passive source. Both techniques will now be described.

Vertically Oriented Velocity Signals: Velocity signals from vertically oriented sensors may be used to compute the source wavefield emitted from the presumed location of the passive source in the direction toward a given motion sensor or motion sensor group 110, as a function of angular frequency ω, using equation 1300 shown in FIG. 13. In equation 1300, $V_z^{dir}(\omega)$ is the isolated direct velocity wavefield from step 904 as recorded by a particular motion sensor or motion sensor group, $R_{sens}^{V_z}(\omega)$ is the response of the same motion sensor or motion sensor group, ρ is the density of the water (and thus ρc represents acoustic impedance where c is the speed of sound in the water), and the other symbols have the same meanings given above as they would apply to the motion sensor or motion sensor group under consideration.

If the motion sensor channel location 110 under consideration contained only a single motion sensor, then N in equation 1300 would be set equal to 1, and only a single set of r, r', θ and θ' need be employed when evaluating equation 1300 for that sensor channel. If, however, the sensor channel location 110 under consideration contained a group of motion sensors (for example, as in the arrangements of FIG. 4 or 5), then multiple sets of r, r', θ and θ' may be employed when evaluating equation 1300 for the sensor channel location 110—one set of values for each of the motion sensors in the sensor group. A single value of $V_z^{dir}(\omega)$ and a single value of $R_{sens}^{V_z}(\omega)$ may be applied for the entire motion sensor group—particularly when the signals from the motion sensor group are aggregated into single channel recording. If separate $R_{sens}^{V_z}(\omega)$ values are known for the individual motion sensors in the group, however, then equation 1300 may be modified accordingly and the separate values brought into the summation as appropriate.

Multi-Axis Velocity Signals: In the case where multi-axis velocity signals are available and the vector rotations described above were used to isolate the direct wavefield at the locations of the sensors, equation 1400, shown in FIG. 14, may be used to compute an estimate of the source wavefield emitted from the presumed location of the passive source in the direction toward a given motion sensor or motion sensor group 110. The symbols used in equation 1400 have the same meanings as the corresponding symbols used in equation 1300, except that the $V_s^{dir}(\omega)$ term used in the numerator of equation 400 denotes the isolated direct velocity wavefield pointing in the direction of the passive source, instead of pointing vertically as was the case with the $V_z^{dir}(\omega)$ term used in the numerator of equation 1300, and $R_{sens}^{V_s}(\omega)$ denotes the response of the motion sensor or sensor group under consideration in equation 1400. Note that, for a given sensor or sensor group, $R_{sens}^{V_s}(\omega)$ may be identical to $R_{sens}^{V_z}(\omega)$. Note also that, in equation 1400, the lefthand term inside the brackets is multiplied by 1, since the isolated direct wave signal under consideration points directly toward the passive source, and the righthand term inside the brackets is multiplied by cos(δ), where δ has the meaning described above in relation to FIG. 11.

As in the cases described above, if the velocity sensor channel 110 under consideration contained a single velocity sensor, then N in equation 1400 would be set to 1, and a single set of r, r' and δ values would be used to evaluate the expression for that sensor channel. If, on the other hand, the sensor channel contained a group of velocity sensors, then separate sets of r, r' and δ values may be used—one set for each velocity sensor in the group. Also as in the cases described above, if separate $R_{sens}^{V_s}(\omega)$ are known for the individual sensors in the group, then the expression of equation 1400 may be modified accordingly and the per-sensor values brought inside the summation.

Backpropagating with Both Pressure Signals and Velocity Signals: In principle the source wavefield estimates computed using pressure signals should be the same as the source wavefield estimates computed using velocity signals. For the sake of reference, however, let any of the source wavefield estimates computed using pressure signals from a sensor location n be denoted $Sp_n$, and let any of the source wavefield estimates computed using velocity signals from the same sensor location n be denoted $Sv_n$. If desired, the passive source wavefield estimate for that sensor location n may be generated using a combination of $Sp_n$ and $Sv_n$. For example, the two source wavefield estimates may be averaged, without more. It is possible, however, that a more accurate combination of the two estimates may be generated for a given sensor location by applying a scaling factor $Sc_n$ computed for that sensor location, where the scaling factor can account for differences in the responses of the pressure sensors and the motion sensors and/or for uncertainties in the acoustic impedance ρc. To do so, a scaling factor $Sc_n$ can be determined for each sensor or sensor group 110. Once the scaling factors are known, the estimated source wavefield emitted in the direction toward a particular sensor or sensor group n can be computed according to equation 7 below:

$$S_n(\omega, \tilde{\theta}) = \frac{1}{2}\left[S_{P_n}(\omega, \tilde{\theta}) + Sc_n S_{V_n}(\omega, \tilde{\theta})\right] \quad (7)$$

where $S_n$ is the source wavefield estimate for sensor channel n. The scaling factor $Sc_n$ for each particular sensor channel n can be solved for by minimizing the following cost function:

$$\Sigma_\omega |S_{P_n}(\omega, \tilde{\theta}) - Sc_n S_{V_n}(\omega, \tilde{\theta})|^2 \quad (8)$$

In any of the above techniques, results from multiple sensors in multiple locations within a small area may be selected and averaged to estimate the signals emitted within a narrow beam from the passive source. This may also help to stabilize the denominators in equations 1200, 1300 and 1400 when estimating the acoustic signals emitted from a passive source around the ghost notch, since the ghost notch frequency will change with emission angle. Such a selection area may be moved around to end up with an estimate of the acoustic wavefield emitted by a passive source as a function of emission angle.

Combining the Per-Sensor-Channel Source Wavefield Estimates: The computations described above (i.e., evaluating equations 1200, 1300 or 1400, and possibly also equation 7) would be performed for each of the sensor channels that were included in the group of sensor channels selected at step 1002 in procedure 1000. The result of those computations would be a set of separate source wavefield estimates corresponding to each of the selected sensor channels. These separate source wavefield estimates would then be combined in a suitable manner for further processing. For example, the separate source wavefield estimates may be averaged to produce an average estimated source wavefield derived from the selected group of sensor channels. Such a combination may also be computed using a sum of weighted source field estimates, if desired, since the closer a receiver is to the source location, the stronger is the direct arrival recorded by that receiver. As was mentioned above, as a practical matter, some signals that are not associated with the direct wavefield may not be filtered out completely when the isolated direct wavefield is computed. Combining multiple source wavefield estimates from different sensor locations using the just-described techniques or other suitable techniques may help to attenuate errors related to such signals having been included in the computed isolated direct wavefield.

Generating the Source Wavefield Estimate Using a System of Linear Equations: Another method will now be described for using the isolated direct wave from multiple receiver locations n to generate an estimate of the source wavefield at a presumed location m of a passive source. According to this method, the estimated source wavefield can be determined by solving an overdetermined system of linear equations $$Ax=b \quad (9)$$

where A in system of equations (9) is the matrix $$A = \begin{bmatrix} R_{sens1}(\omega)P_{m1}(\omega) \\ R_{sens2}(\omega)P_{m2}(\omega) \\ \vdots \end{bmatrix} \quad (10)$$

and where the number of rows in matrix A is equal to the number of receiver locations (sensor channels) selected at step 1002 in procedure 1000. For each of the rows in matrix A, $Rsens_n$ is the response of sensor channel n, and $Pm_n(\omega)$ is a propagation operator (to be further described below) expressing the propagation of acoustic energy from the passive source location m through the body of water to the location of sensor channel n. The unknown x in system of equations (9) is $S_m(\omega)$, the estimated passive source wavefield at location m, and b in system of equations (9) is the column matrix $$b = \begin{bmatrix} D_1(\omega) \\ D_2(\omega) \\ \vdots \end{bmatrix} \quad (11)$$

where each term $D_n(\omega)$ is the isolated direct wavefield arriving at sensor channel n from the passive source at location m.

For pressure sensor channels, the propagation operator corresponds to the summation in the denominator of equation 1200 given in FIG. 12, as follows:

$$P_{mn}(\omega) = \frac{1}{N}\sum_{n=1}^{N} \left[ \frac{e^{-i\omega r_{mn}/c}}{r_{mn}} + R\frac{e^{-i\omega r'_{mn}/c}}{r'_{mn}} \right] \quad (12)$$

For vertically oriented motion sensor channels, the propagation operator corresponds to the summation in the denominator of equation 1300 given in FIG. 13, as follows:

$$P_{mn}(\omega) = \frac{1}{N}\sum_{n=1}^{N} \left[ \cos(\theta_{mn})\frac{e^{-i\omega r_{mn}/c}}{r_{mn}} + \cos(\theta'_{mn})R\frac{e^{-i\omega r'_{mn}/c}}{r'_{mn}} \right] \quad (13)$$

For motion sensor channel signals that have been rotated as described above so that one rotated magnitude from the sensor channel points directly toward the location of the passive source, the propagation operator corresponds to the summation in the denominator of equation 1400 given in FIG. 14, as follows:

$$P_{mn}(\omega) = \frac{1}{N}\sum_{n=1}^{N} \left[ \frac{e^{-i\omega r_{mn}/c}}{r_{mn}} + \cos(\delta_{mn})R\frac{e^{-i\omega r'_{mn}/c}}{r'_{mn}} \right] \quad (14)$$

Using the above system of linear equations, the unknown x may be solved for using any of several known techniques. For example, according to the known technique of least squares minimization, a solution for x may be expressed as $$x = \min_{x}\|Ax - b\| \quad (15)$$

A solution for such a least squares minimization may be found using $$x=(A^TA)^{-1}A^Tb \quad (16)$$

where T denotes the transpose of a matrix. If desired, a solution for such a least squares minimization may also be found using the known technique of QR factorization (also known as QR decomposition, or QU factorization).

Note that the linear equation method described above may also be used to solve for multiple point sources simultaneously by having M number of columns in matrix A where M is the number of point sources. Doing so may be useful, for example, in conjunction with the scanning technique to be described further below. In such a case, the lower case m subscript would be 1 in the first column, 2 in the second column, and M in the last column. When solving for x, the result will contain as many values as the number of point sources (M).

Time Windows

The processes described above for isolating a direct wavefield at the location of the sensor channels (i.e., step 904), and for generating an estimate of a corresponding passive source wavefield at a location of the passive source (i.e., step 906), may be performed in a series of time windows in a manner to be described next.

One reason for employing time windows is because the attributes of a passive source wavefield may change as a function of time. Another reason for doing so may arise, for example, when employing the iterative scanning technique to be further described below. In that technique, time windowing is beneficial for iteratively identifying point source locations because a non-zero span of time is needed for the scanning process, and because point source locations associated with any passive source may change as a function of time. Time windows chosen for use in the iterative scanning technique should not be so long, however, that such variations in the point source locations over time are not captured.

When sources and receivers are moving relative to each other, ideally the operators describing the propagation of the wavefield from the source to the receivers should be calculated for every time sample. Doing so could be computationally expensive. If, on the other hand, there are relatively small changes in distances between the source and the receivers over a certain length of time, then one may assume that the same propagation operators can be used over a time window to reduce the number of computations required. In the case of towed streamers, such distances may change relatively slowly due to the fact that the vessel and the streamers typically travel together. Therefore, in the case of towed streamers, relatively long time windows can be used. In the case of stationary receivers (e.g., ocean bottom cables or ocean bottom nodes) and moving sources (e.g., a vessel that is sailing near the stationary receivers), the relative distances change more rapidly. Therefore, in those cases, it may be desirable to choose time windows that are substantially shorter than in the towed streamer case.

Figure 15:
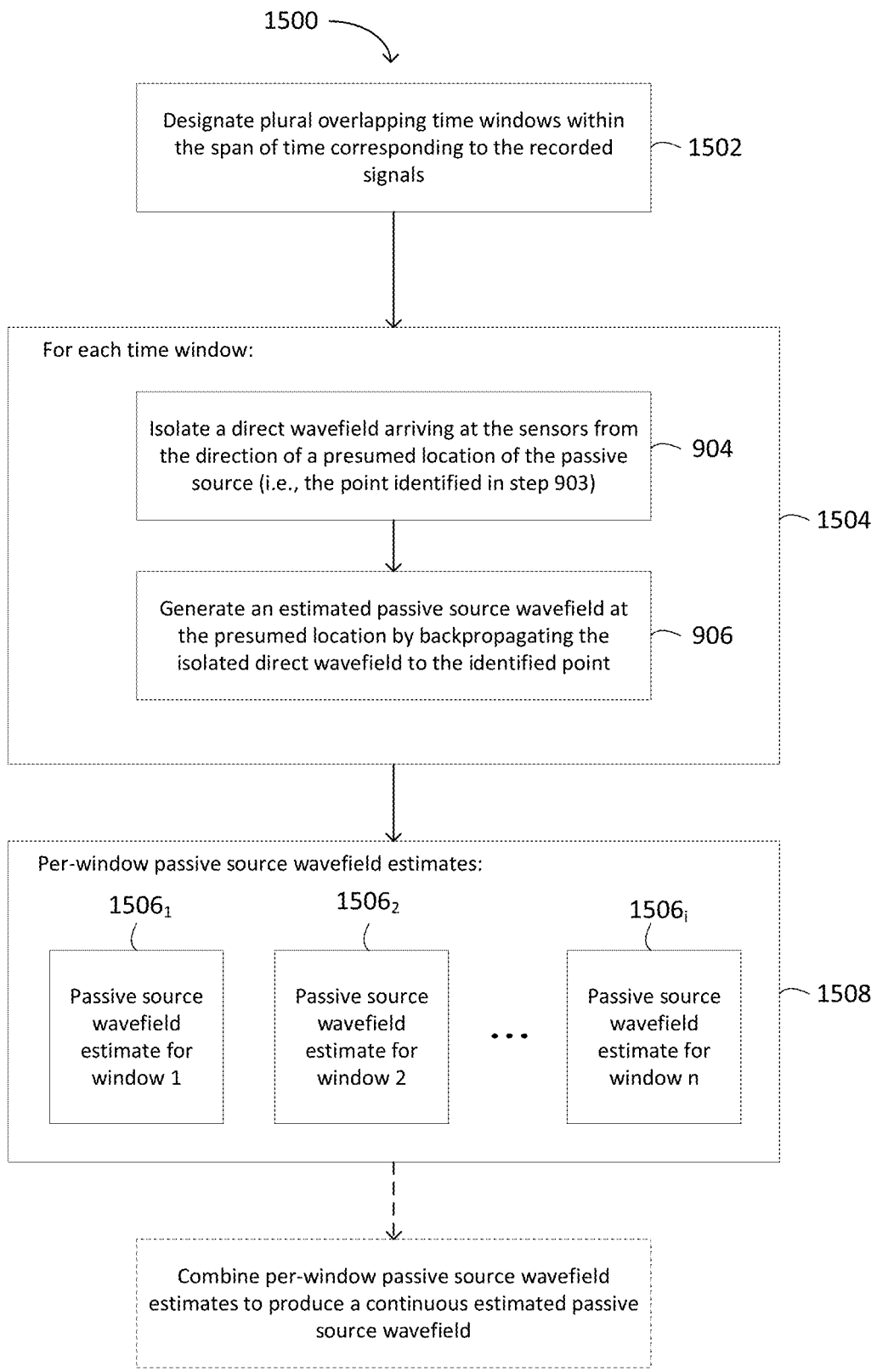
FIG. 15 is a flow diagram illustrating an example method for performing the isolation and generation steps of FIG. 9 in a plurality of time windows, in accordance with embodiments.

FIG. 15 illustrates such a process 1500 that incorporates time windows by way of example. At step 1502, a plurality of time windows is designated. In most embodiments, it will likely be beneficial for the designated time windows to overlap one another, although this may not necessarily be the case in every embodiment. In the aggregate, the time windows span a time period that corresponds to the time period during which the sensor channel data were recorded. For example, the total time period spanned by the overlapping windows in the aggregate may be less than or equal to the total period of time during which the sensor channel data were recorded, but in any event each designated time window corresponds to at least one time period during which sensor channel data were recorded. Although time window duration would normally be chosen to be the same for each of the time windows designated in step 1502, the time window duration itself may vary based on the application at hand. For most cases, it is believed that a relatively short time window duration on the order of 5 to 20 seconds will be appropriate.

As indicated at step 1504, steps 904 and 906 are performed for each of the designated time windows. During any given iteration within step 1504 (that is, during the computations being performed for any given one of the time windows), only the channel data that correspond to the particular time window are used. Steps 904 and 906 may be performed for a time window using any of the techniques described above, for example.

As is indicated in step 1508, assuming that i time windows were designated in step 1502, the result of performing step 1504 is a set of per-time-window passive source wavefield estimates 15061 to 1506—one for each of the i time windows.

If desired, these per-time-window passive source wavefield estimates 1506 may be used independently. For example, each per-time-window source wavefield estimate 1506, may be used along with sensor channel data from time window i by treating the time window as a shot record. According to this technique, one or more images of a subsurface volume may be produced by applying techniques that are known to be applicable to discrete shot records recorded during seismic surveys that use active sources.

In other embodiments, the per-time-window passive source wavefield estimates may be combined, as indicated at step 1510, to produce a continuous estimated passive source wavefield. In the latter embodiments, the continuous estimated passive source wavefield may be used to produce one or more images of a subsurface volume using a variety of available techniques, including those to be discussed further below. In these embodiments, the continuous passive source wavefield produced in step 1510 may span the same period of time that is spanned in the aggregate by the series of time windows designated in step 1502. Such a combination of the per-time-window passive source wavefield estimates may be produced according to a variety of techniques, such as by using as any of the general class of techniques illustrated in FIG. 16.

Figure 16:
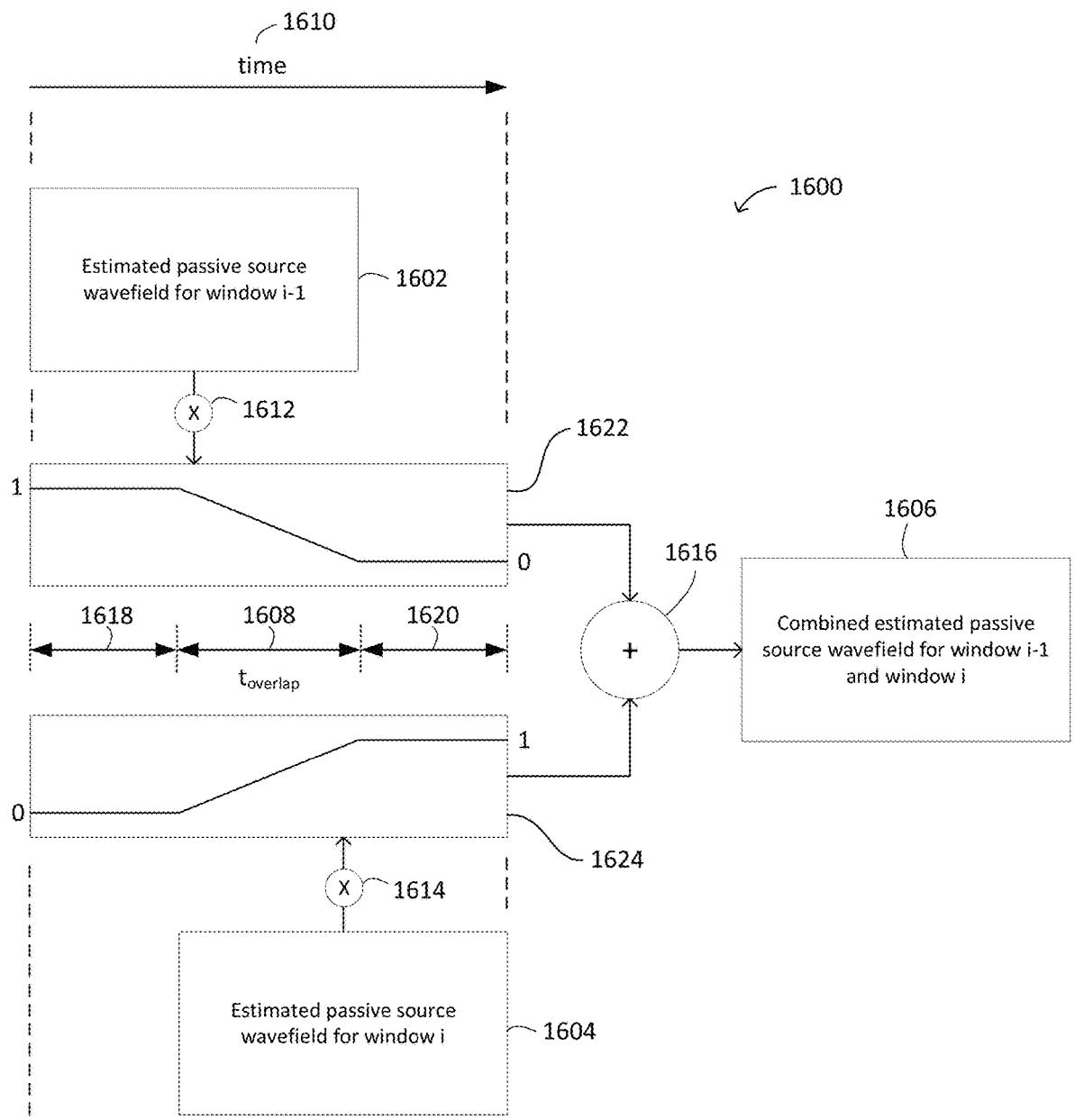
FIG. 16 is a schematic diagram illustrating an example method for combining the per-time-window passive source wavefield estimates of FIG. 15, in accordance with embodiments.

Referring now to FIG. 16, process 1600 generally depicts a procedure for producing a weighted sum of time samples 1606 from two or more different time windows 1602, 1604.

In the example illustrated, each of time windows 1602, 1604 has equal duration d, but the absolute time periods spanned by each window are distinct, with an overlap in time span 1608, which span is denoted $t_{overlap}$. The combined time window 1606 in this example would have a duration=2d−$t_{overlap}$. Procedure 1600 may iterate over time samples from left to right, as indicated at 1610. For each time increment, corresponding samples from each of time windows 1602, 1604 (potentially with weights applied to the samples as indicated at 1612 and 1614) are summed, as indicated at 1616, and the resulting value is stored at a corresponding time index of window 1606. In general, each sample may comprise one or more amplitude values and one or more location values. In such cases, the amplitude and location components would be weighted and summed separately such that each sample contained in the combined window 1606 would have the same number of and types of component values as do the samples contained in windows 1602 and 1604. For time spans such as 1618, 1620 where windows 1602 and 1604 do not overlap, only the time windows whose samples correspond to that time span will contribute to the sum. For example, in time span 1618, samples from time window 1604 will not contribute to the sum. In time span 1620, samples from time window 1602 will not contribute to the sum. (In the general case, and depending on how the time windows are defined, more than two time windows may overlap in a given time span.)

Weighting functions 1622 and 1624 are shown by way of example and not by way of limitation. In various embodiments, different weighting functions may be applied. As one example, constant weights may be applied to each sample such that the samples in combined window 1606 represent simple averages of the corresponding samples from windows 1602, 1604. As another example, non-linear weighting functions may be applied. In the example shown, linear weighting functions are applied to achieve a linear tapering effect in the combination. According to the tapering technique illustrated, in a time span where earlier and later time windows overlap, decreasing weights are applied to component samples from the earlier time window as time increases, and increasing weights are applied to component samples from the later time window as time increases. Thus, in time span 1608, decreasing weights are applied to samples from window 1602 as time increases (e.g., weights decreasing from 1 to 0), while increasing weights are applied to samples from window 1604 as time increases (e.g., weights from 0 to 1). Other suitable technique may also be used for combining the samples from the individual time windows to produce a combined estimated passive source wavefield.

Scanning Technique to Identify One or More Point Sources Using Recorded Survey Data A further technique will now be described wherein ambient acoustic energy present in the marine environment may be modeled as one or more point sources. In some embodiments, locations as well as the characteristics of the one or more point sources may be identified from the recorded survey data itself in an iterative fashion using a scanning technique. In a degenerate case, the scanning technique may identify and characterize only a single point source, in which case the corresponding passive source wavefield may be assumed to be omnidirectional. In the more general case, the scanning technique may identify and characterize numerous point sources at different locations, and the passive source wavefield may be modeled as a combination of the identified point sources. In the latter case, the estimated passive source wavefield may exhibit directionality. Consequently, a passive source wavefield estimate made according to the latter techniques (e.g., by identification and superposition of several point sources) may provide a more accurate estimate of the actual passive acoustic energy wavefield, which in many cases would have directional rather than omnidirectional characteristics.

Figure 17:
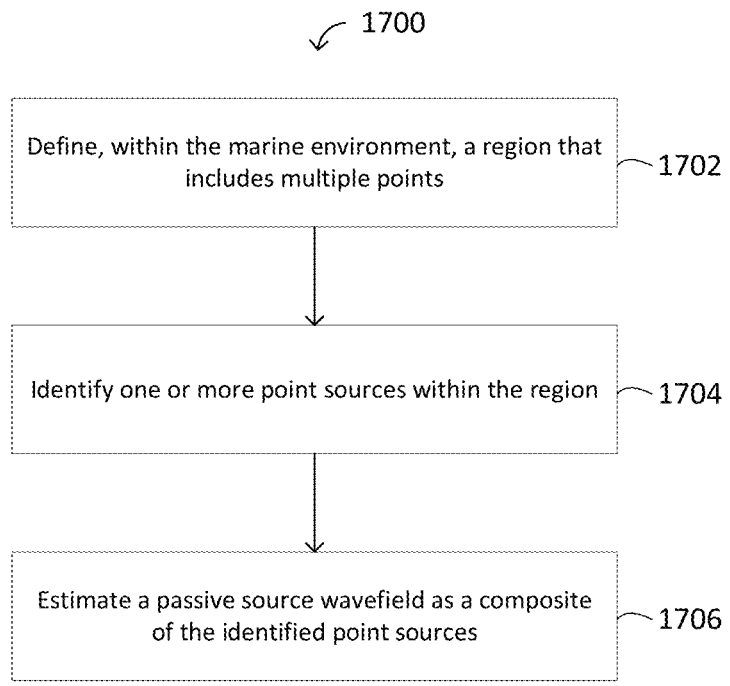
FIG. 17 is a flow diagram illustrating an example method for generating an estimated passive source wavefield as a composition of multiple point source wavefields, in accordance with embodiments.

Procedure 1700, illustrated in FIG. 17, provides a general description of these techniques. In step 1702, a region within the marine environment of the survey is defined. Such a region may correspond to a three-dimensional volume, or may correspond to a two-dimensional plane in any suitable orientation appropriate to the physical circumstances of the survey. The size and shape of the region may vary according to the level of precision with which the likely location of a passive source or sources is known. In cases where some information is available about the likely location of a passive source, a relatively small region may be defined to include the likely location. For example, referring briefly to FIG. 21, if a passive source is likely to be associated with a vessel 2100 in the marine environment of a survey, and if the location of the vessel is known, a horizontally-oriented 2D region 2102 may be defined as shown. Depending on the size of the vessel and the areas on the vessel from which acoustic emissions are likely, the size of region 2102 could be on the order of 50 m×50 m. In the illustrated example, region 2102 is defined to include a point 2104 on the stern of the vessel where the propellers of the vessel are located. Thus, the plane of region 2102 is below the water line. Many other sizes and shapes for such a region are possible. In cases where the presence of passive sources in the vicinity of the survey is likely, but their locations are truly unknown, a very large area (on the order of plus or minus 10 km centered on the seismic receivers used in the survey) may be defined. In an intermediate case, in which the passive source energy may be distributed across a relative wide but known area— as, for example, in a windmill farm—the region may be defined to have an intermediate size between those of the previous two examples. In any case, the region may be defined to include an area or volume in which there is some probability of a passive source being located.

Referring now back to FIG. 17, in step 1704, locations and characteristics of one or more point sources may be identified within the defined region. This may be accomplished using a variety of techniques including the scanning technique to be further described below. In step 1706, a passive source wavefield may be estimated as a composite (e.g., a superposition) of the identified and characterized point sources.

Figure 18:
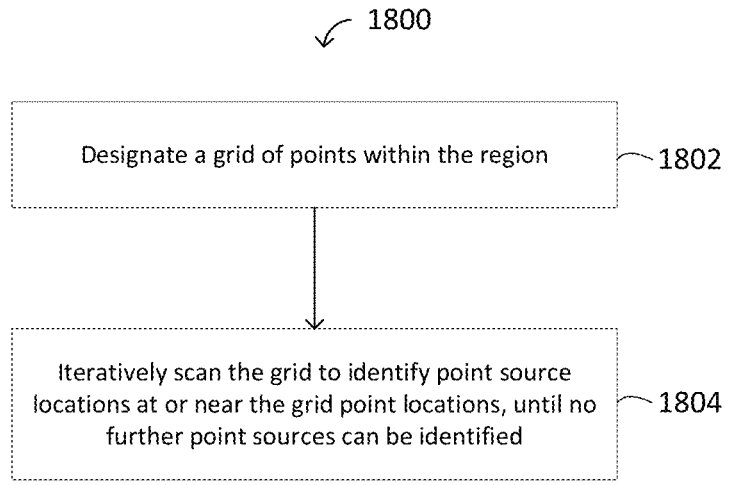
FIG. 18 is a flow diagram illustrating an example method for performing the identification and estimation steps of FIG. 17, in accordance with embodiments.

Scanning Technique for Iterative Identification and Characterization of Point Sources: FIG. 18 illustrates an example procedure 1800 whereby step 1704 may be performed in an iterative fashion. In step 1802, a grid of points may be designated within the region defined in step 1702. The grid of points so defined may include any number of points, and the points themselves may be arranged within the region in any suitable fashion. In most embodiments, the number and arrangement of points will be such that a computer process may iterate through them in a straightforward manner. For example, the grid of points may be arranged in rows and columns, as illustrated at 2102 in FIG. 21. In step 1804, the grid of points may be scanned iteratively to identify and characterize one or more point sources at or near the grid points, until no further point sources can be identified. For example, an application of scanning step 1804 might identify the locations and characteristics of four point sources 2106, 2108, 2110, 2112, at or near any of grid points 2114, after four iterations.

Figure 21:
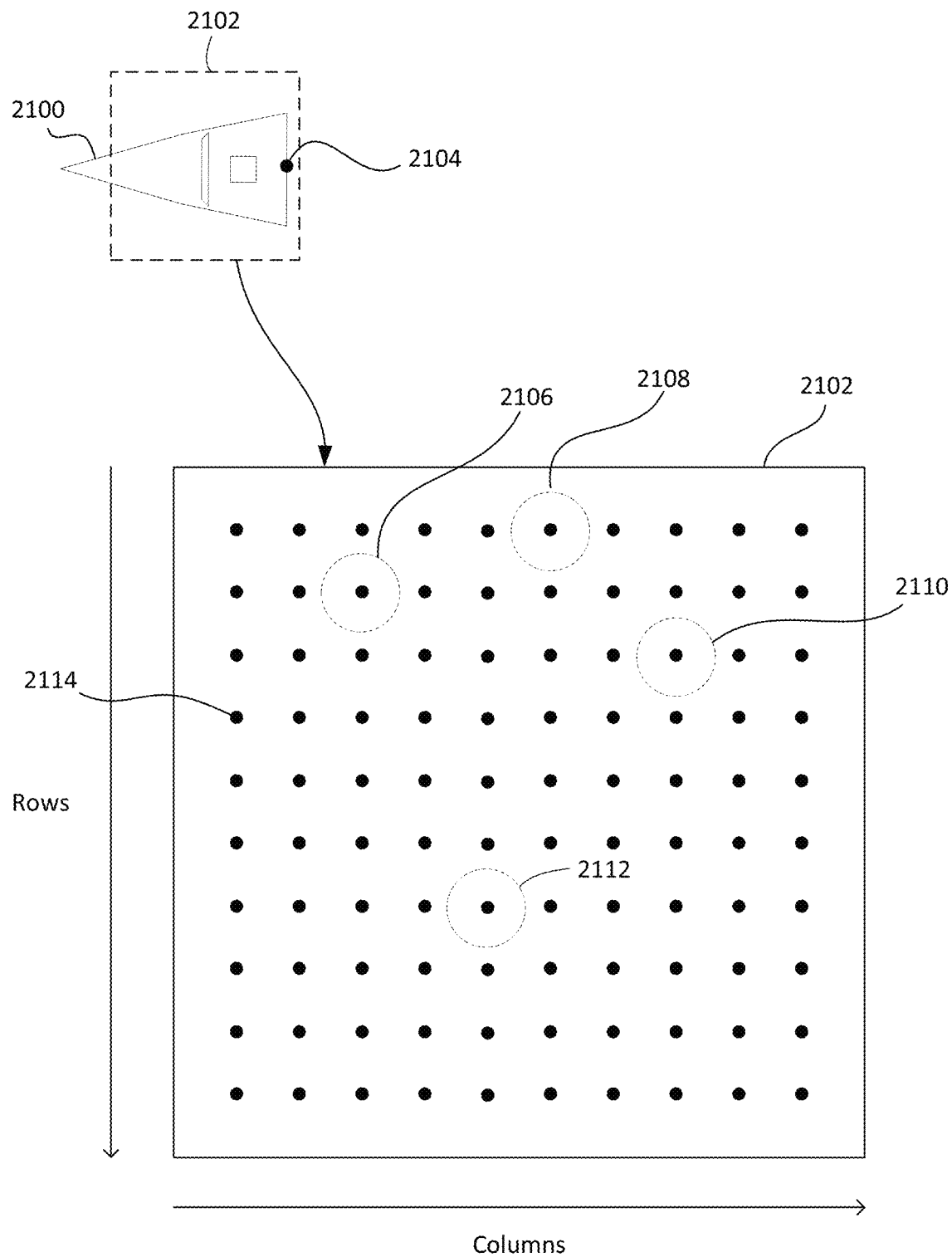
FIG. 21 is a schematic diagram illustrating, by way of example, several point sources that may be identified and characterized using the methods of FIGS. 17-20, in accordance with embodiments.

Procedures 1700 and 1800 have been described above with reference to the survey configuration illustrated in FIG. 21, in which a vessel is assumed to be the physical source of acoustic energy, and in which the location of the vessel is known. It should be noted, however, that these procedures are not limited to the specific case illustrated in FIG. 21 but may instead be applied more generally. For example, the procedures may be applied to any of the survey configurations and scenarios described above, whether or not a likely location of a passive source is known prior to applying the procedures.

Figure 19:
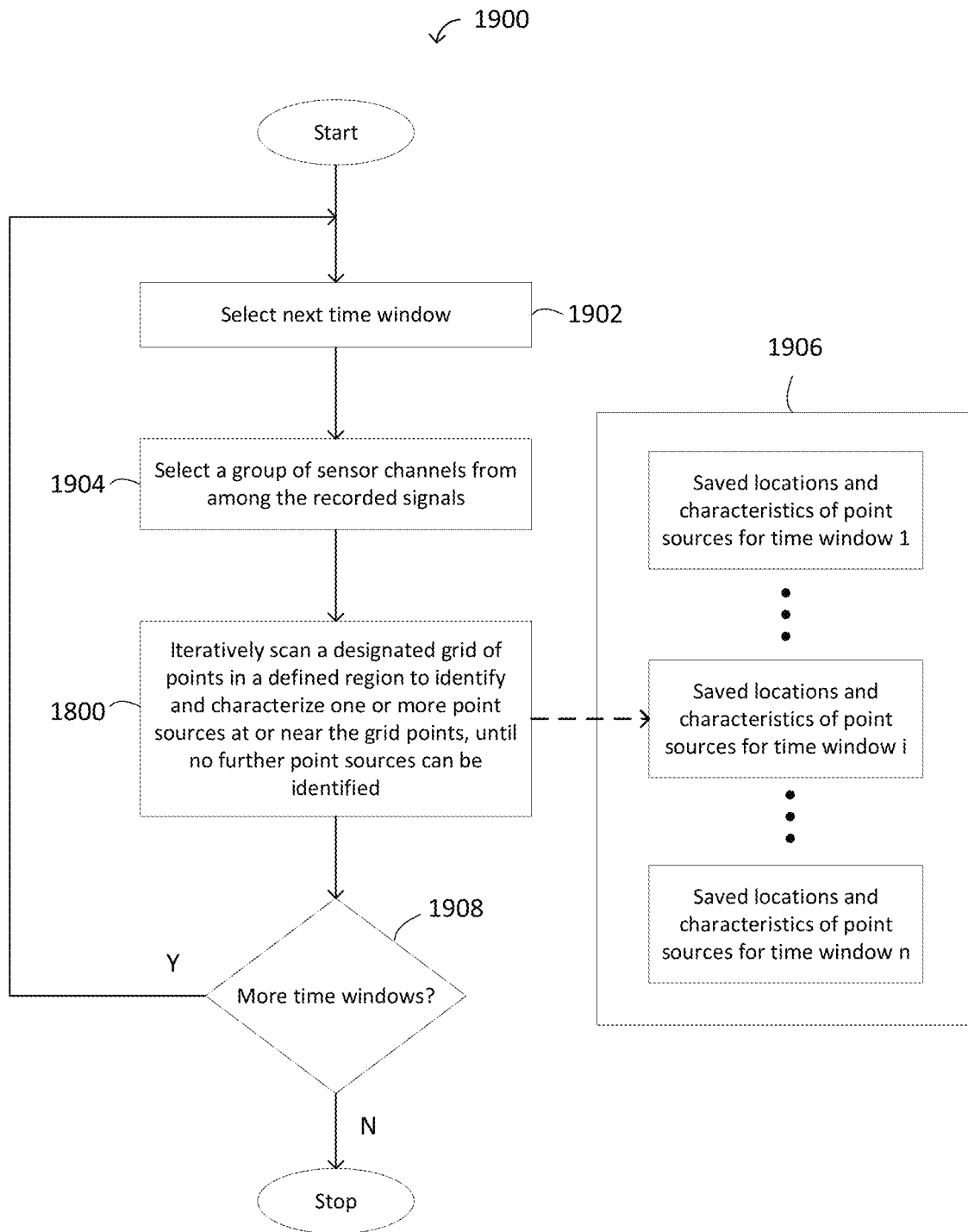
FIG. 19 is a flow diagram illustrating an example method for performing the methods of FIGS. 17 and/or 18 in a series of time windows, in accordance with embodiments.

Performing Procedures 1700 or 1800 in Time Windows: For reasons described above including, for example, the time varying nature of passive source characteristics and possible relative motion between the passive source and the sensor channels, it may be desirable in some embodiments to perform procedures 1700 and/or 1800 in each of a series of time windows, in a manner similar to procedure 1500 described above. FIG. 19 illustrates an example procedure 1900 for doing so.

The time windows selected for procedure 1900 may be the same as or similar to those described with reference to procedure 1500. Results from each time window from procedure 1900 may be used separately, in the manner described in relation to per-time-window source wavefield estimates 1508, or they may be combined, such as in the manner discussed above with reference to procedure 1600. At step 1902 of procedure 1900, a next time window is selected for processing. At step 1904, a group of sensor channels is selected from among the recorded signals from the seismic survey. In some embodiments, the sensor channels selected may be a proper subset of the available sensor channels from the survey. For example, in embodiments where the likely location of a passive source is known, the selected sensor channels may correspond to those sensor channels that are closest to the likely location of the passive source during the current time window. In other embodiments, the selected sensor channels may correspond to all of the available sensor channels. Other choices are also possible. The group of sensor channels selected in step 1904 may be different for each time window. After the sensor channels are selected, iterative procedure 1800 may be performed using the selected sensor channel data corresponding to the current time window. In the latter embodiments, the region defined in step 1702 may be different for each time window, or may be the same region for each time window, as appropriate given the facts relating to the particular survey under consideration.

As was described above, procedure 1800 iteratively scans a designated grid of points in a defined region to identify and characterize one or more point sources at or near the grid points, until no further point sources can be identified. As each point source is identified, the location of the point source and the estimated source wavefield corresponding to the point source are stored for later use, as indicated at 1906. (Note, however, that if the linear equations method described above is employed, multiple point source wavefields may be solved for simultaneously.) Procedure 1900 continues until all desired time windows have been processed, as indicated at 1908. The result of performing procedure 1900 will be that a set of per-time-window source wavefield estimates 1906 will have been collected. Collection 1906 will be analogous to the collection shown at 1508 above, with the possible difference that each of the per-time-window source wavefield estimates in 1906 may include more than one identified and characterized point source.

Figure 20A:
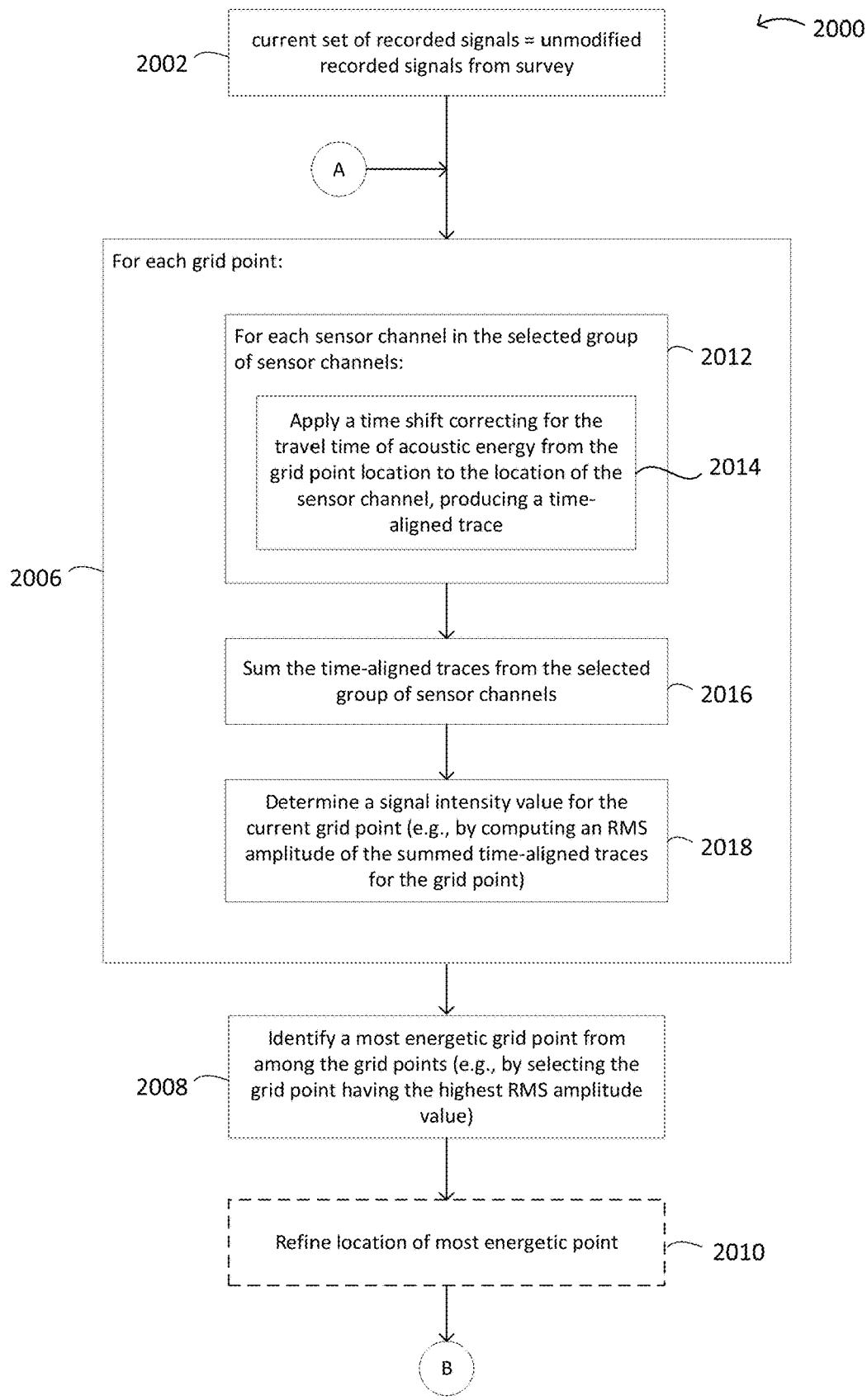
FIGS. 20A and 20B are flow diagrams illustrating an example scanning technique that may be used in the methods of FIGS. 17 and/or 18, in accordance with embodiments.
Figure 20B:
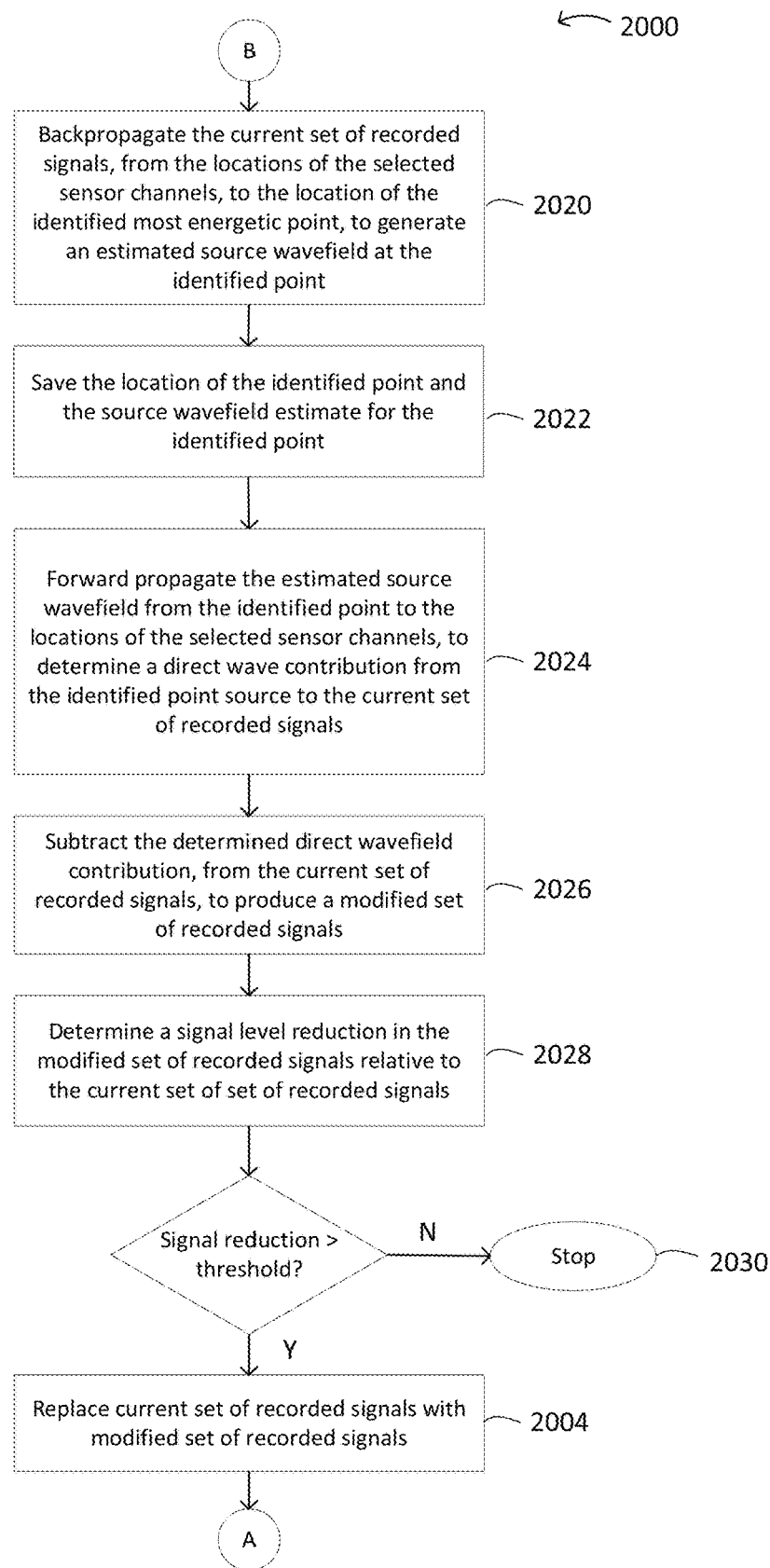

Example Scanning Procedure: FIGS. 20A and 20B illustrate, by way of example, a more detailed procedure 2000 that may be used to perform the iterative scanning step indicated at step 1804. Procedure 2000 is an iterative procedure during which a set of recorded sensor channel signals are stepwise modified as the iterations proceed. Accordingly, the steps in procedure 2000 refer to a "current" set of recorded signals. At the start of the procedure, in step 2002, the current set of recorded signals is initialized to the values of the unmodified recorded signals from the sensor channels that were chosen for use in the current time window. This set of sensor channel recordings may correspond, for example to those selected at step 1002 in procedure 1000. Thereafter, at the end of each iteration (except for the final iteration), the current set of recorded signals is replaced with a modified set generated during the current iteration (see step 2004), and the procedure repeats again at A using the new, modified, set of recorded signals. In this manner, modifications made to the set of recorded signals accumulate as the iterations proceed.

Steps 2006 and 2008, in combination, serve to identify a most energetic one of the grid points that were designated in step 1802. They do so by backpropagating the current set of recorded signals to the location of each one of the designated grid points, and by determining a backpropagated signal intensity value for each of the grid points (step 2006). The backpropagated signal intensity values are then used to identify a most energetic one of the grid points (step 2008). For example, the most energetic grid point may correspond to the grid point having the highest backpropagated signal intensity value among those computed for all of the grid points in step 2006. If desired, the location of the most energetic grid point may be further refined in step 2010. Such a refinement may be accomplished in a number of ways. According to one technique, an interpolation may be performed using the intensity values of the most energetic grid point and those of the surrounding grid points. According to another technique, a new, smaller region may be defined around the most energetic grid point, and procedure 2000 may be performed recursively on the new, smaller region. The result of such a refinement step 2010 may be a location that does not correspond exactly to any of the originally designated grid points. After the location of a most energetic point has been identified, the identified point may be treated as a presumed location of a passive source, as that term has been defined and described above.

In the event that no single most energetic point can be identified in step 2008, iterations may stop (i.e., the procedure may jump to step 2030).

An example method for performing step 2006 is indicated by steps 2012-2018. As indicated at 2006, steps 2012-2018 are performed for each grid point. And, for each grid point, step 2014 is performed for each sensor channel in the current set of recorded signals. As step 2014 is performed for a given sensor channel, a time shift is applied to the sensor channel. The applied time shift corrects for the travel time of acoustic energy in the body of water from the grid point location to the location corresponding to the sensor channel. This produces a time-aligned trace in the sense that, after step 2014 has been applied to all of the sensor channels in the selected group, direct arrival events originating from the grid point will be time-aligned across all of the time-aligned sensor channel traces. In step 2016, the time-aligned sensor channel traces may be summed. Then, in step 2018, a signal intensity value may be computed based on the summed traces. Such a value may correspond, for example, to the root-mean-square ("RMS") amplitude of the summed traces. In such a case, the most energetic grid point identified in step 2008 may correspond to the grid point having the highest computed RMS amplitude value.

Once the location of a most energetic point has been identified—and thus a presumed location of a passive source—the procedure continues with step 2020, shown in FIG. 20B. In step 2020, an estimated source wavefield corresponding to the identified point is generated by backpropagating the current set of recorded signals from the locations of the sensor channels to the location of the identified point. Once this has been done, the point source has been characterized. Accordingly, the location of the identified point and the estimated source wavefield corresponding to the identified point are saved, at step 2022, for later use.

Then, at step 2024, the procedure determines a direct wavefield contribution from the identified point source to the signals that were recorded by the sensor channels. This may be accomplished by forward propagating the estimated source wavefield from the location of the point source to the locations of the sensor channels. Such a forward propagation may be performed according to known techniques, and/or by using techniques described above. In step 2026, the direct wavefield contribution determined in step 2024 is subtracted from the current set of recorded signals. The subtraction produces a modified set of recorded signals. Finally, in step 2028, the procedure determines an amount of signal level reduction that was achieve by the subtraction. This may be accomplished by comparing a signal level of the current set of recorded signals with a signal level of the modified set of recorded signals. If the signal level reduction achieved by the subtraction was significant (e.g., more than a threshold amount of signal level reduction was achieved), then the current set of recorded signals is replaced with the modified set of recorded signals (step 2004), and a further iteration is performed to potentially identify further point sources. On the other hand, if the level of signal reduction was not significant, then the iterations may stop, as indicated at 2030.

Example Results

Figure 22:
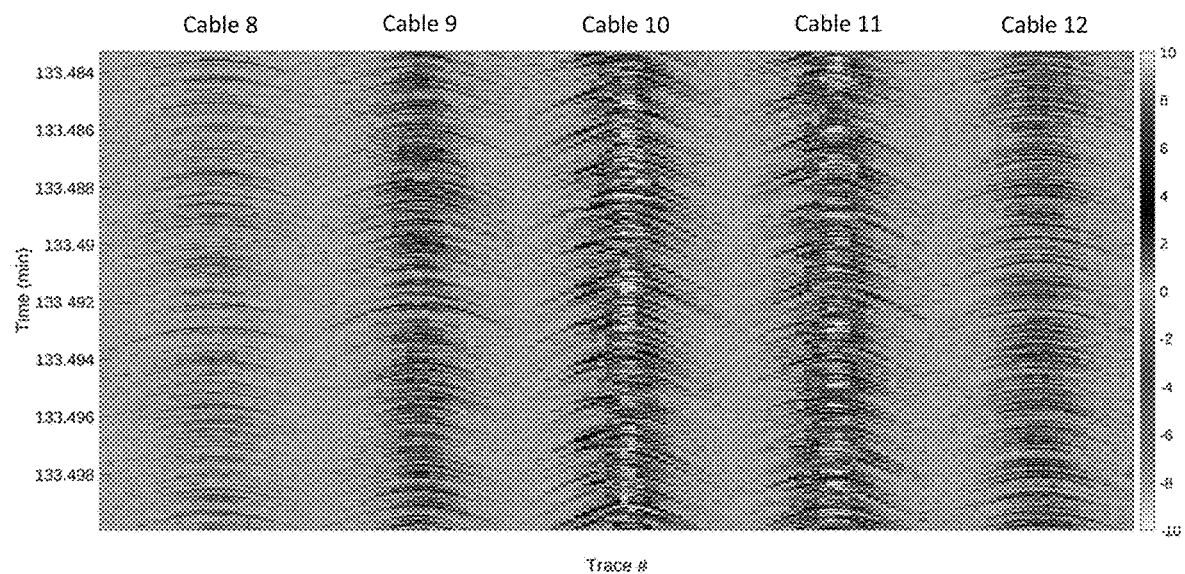
FIGS. 22 and 23 are images of actual recorded seismic signals as the signals appeared before (FIG. 22) and after (FIG. 23) applying the method of FIG. 20 to the signals, in accordance with embodiments.
Figure 23:
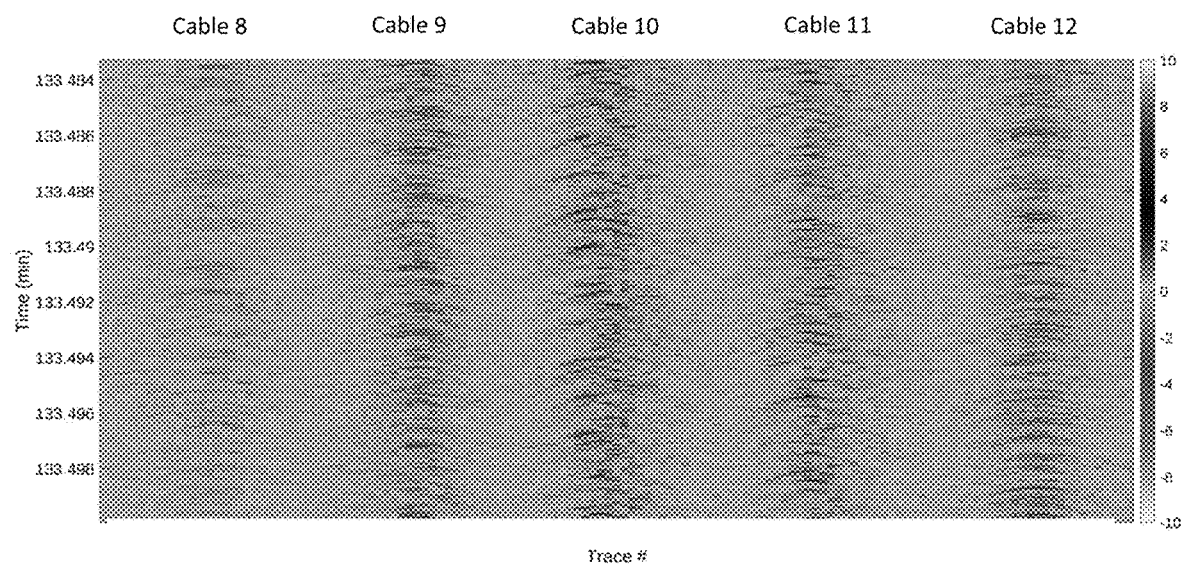

FIGS. 22 and 23 present before and after pictures, respectively, that were generated from actual marine seismic survey data using the iterative procedure of FIG. 20. Each image represents seismic sensor channel recordings that were gathered using five towed streamers during the survey. The streamer data are arranged by streamer in vertical columns labeled Cable 8 through Cable 12. For each column, time increases downward and sensor channel locations along the streamer are distributed left to right. Signal intensity values are shown with shading, according to the legend shown on the right.

The intensity values shown in FIG. 22 are as they were recorded by the sensor channels in the field (i.e., the original, unmodified, recorded signals). The higher intensity values shown correspond to direct arrivals reaching the streamers from a passive source (in this case, passive acoustic energy that was emitted by a vessel sailing approximately over streamer cables 10 and 11 in a configuration similar to that shown in FIG. 6). The intensity values shown in FIG. 23 are the same sensor channel recordings as they appeared following ten iterations of procedure 2000, during which ten individual point sources were identified and characterized in a region defined around the vessel in the manner described above. As can readily be seen from the images, procedure 2000 has removed a significant amount of the direct arrival energy that originally appeared in the sensor channel data of FIG. 22. The substantial reduction in direct arrival energy shown is evidence that the point sources identified by the procedure were able to characterize, quite accurately, the source wavefield associated with the vessel by locating and characterizing a number of point sources disposed on or near the vessel.

Generating the Image

Once one or more estimated passive source wavefields have been generating using the techniques described above, an image of a subsurface volume 607 may be generated using variety of known techniques. For example, the estimated passive source wavefield may be deconvolved from the signals recorded by the sensor channels to produce an impulse response of the subsurface earth volume. If desired, generating the image may be performed using a continuous estimated passive source wavefield produced, for example, according to any of the methods described above in relation to FIG. 16. An example method for doing so is to use methods developed for data acquired with active seismic sources, such as the method described in Hegna, et al., "The Continuous Wavefields Method: Using Electro-Mechanical Sources," SEG 2019 Technical Program Expanded Abstracts at 5407 (SEG 2019). Other methods may also be used.

Example Computer System

Figure 24:
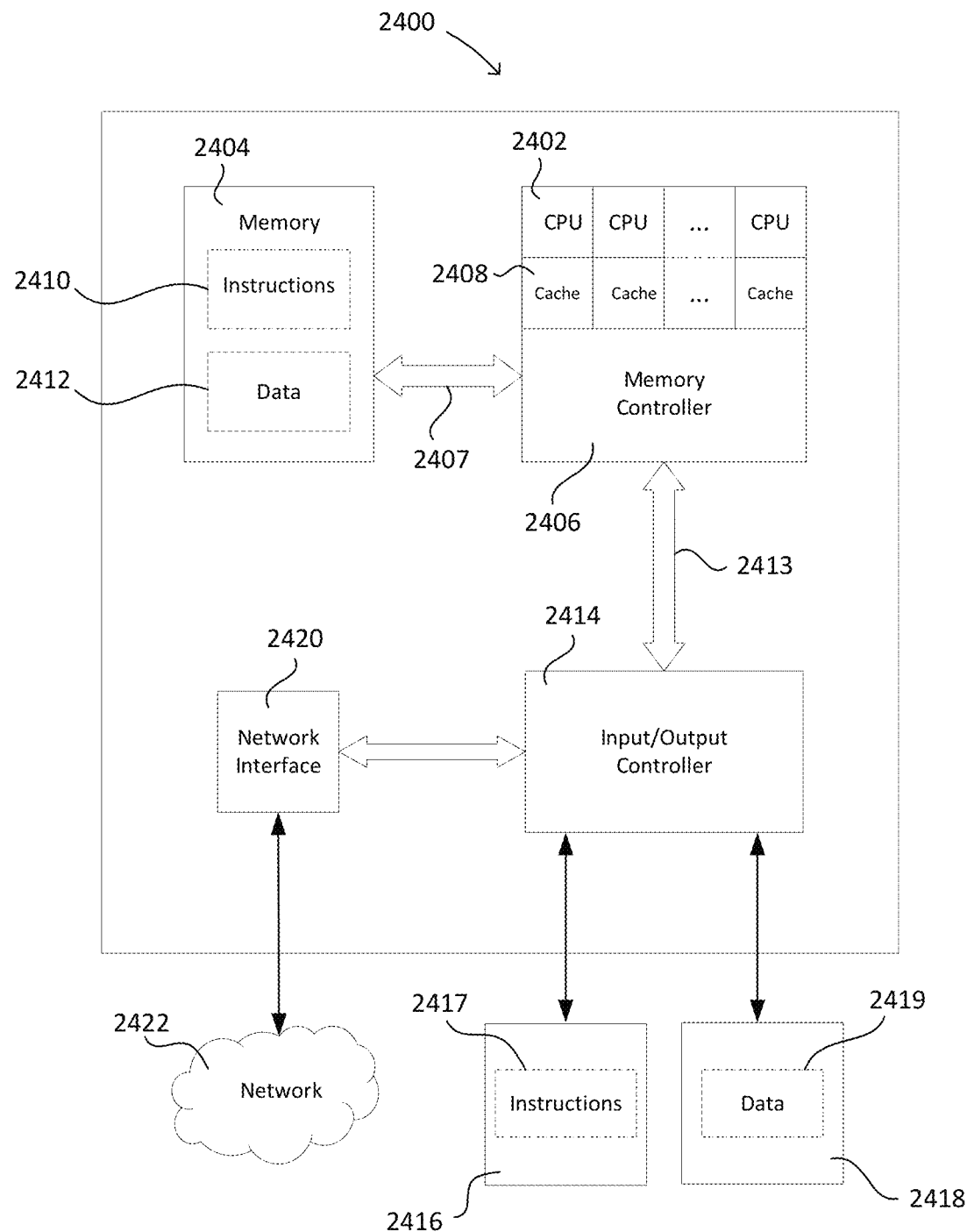
FIG. 24 is a block diagram illustrating an example computer system that may be used to perform the methods of FIGS. 9-21, in accordance with embodiments.

FIG. 24 is a block diagram illustrating an example computer system 2400 that may be used to implement any of the methods described above. Computer system 2400 includes one or more central processor unit ("CPU") cores 2402 coupled to a system memory 2404 by a high-speed memory controller 2406 and an associated high-speed memory bus 2407. System memory 2404 typically comprises a large array of random-access memory locations, often housed in multiple dynamic random-access memory ("DRAM") devices, which in turn are housed in one or more dual inline memory module ("DIMM") packages. Each CPU core 2402 is associated with one or more levels of high-speed cache memory 2408, as shown. Each core 2402 can execute computer-readable instructions 2410 stored in system memory 2404, and can thereby perform operations on data 2412, also stored in system memory 2404.

Memory controller 2406 is coupled, via input/output bus 2413, to one or more input/output controllers such as input/output controller 2414. Input/output controller 2414 is in turn coupled to one or more non-transitory computer readable media such as computer-readable medium 2416 and computer-readable medium 2418. Non-limiting examples of such computer-readable media include so-called solid-state disks ("SSDs"), spinning-media magnetic disks, optical disks, flash drives, magnetic tape, and the like. Media 2416, 2418 may be permanently attached to computer system 2400 or may be removable and portable. In the example shown, medium 2416 has instructions 2417 (e.g., software or firmware) stored therein, while medium 2418 has data 2419 stored therein. Operating system software executing on computer system 2400 may be employed to enable a variety of functions, including transfer of instructions 2410, 2417 and data 2412, 2419 back and forth between media 2416, 2418 and system memory 2404.

Computer system 2400 may represent a single, standalone computer workstation that is coupled to input/output devices such as a keyboard, pointing device and display. It may also represent one node in a larger, multi-node or multi-computer system such as a cluster, in which case access to its computing capabilities may be provided by software that interacts with and/or controls the cluster. Nodes in such a cluster may be collocated in a single data center or may be distributed across multiple locations or data centers in distinct geographic regions. Further still, computer system 2400 may represent an access point from which such a cluster or multi-computer system may be accessed and/or controlled. Any of these or their components or variants may be referred to herein as "computing apparatus" or a "computing device."

In example embodiments, data 2419 may correspond to sensor measurements or other data recorded during a marine geophysical survey, and instructions 2417 may correspond to algorithms for performing any of the methods described herein.

Geophysical Data Products: In such embodiments, instructions 2417, when executed by one or more computing devices such as one or more of CPU cores 2402, cause the computing device to perform operations described herein on the data, producing results that may be stored in one or more non-transitory computer-readable media such as medium 2418. In such embodiments, medium 2418 constitutes a geophysical data product that is manufactured by using the computing device to perform methods described herein and by storing the results in the medium. Geophysical data product 2418 may be stored locally or may be transported to other locations where further processing and analysis of its contents may be performed. If desired, a computer system such as computer system 2400 may be employed to transmit the geophysical data product electronically to other locations via a network interface 2420 and a network 2422 (e.g., the Internet). Upon receipt of the transmission, another geophysical data product may be manufactured at the receiving location by storing contents of the transmission, or processed versions thereof, in another tangible, non-volatile, computer readable medium. Similarly, geophysical data product 2418 may be manufactured by using a local computer system 2400 to access one or more remotely-located computing devices in order to execute instructions 2417 remotely, and then to store results from the computations on a medium 2418 that is attached either to the local computer or to one of the remote computers. The word "medium" as used herein should be construed to include one or more of such media.

Conclusion

Multiple specific embodiments have been described above and in the appended claims. Such embodiments have been provided by way of example and illustration. Persons having skill in the art and having reference to this disclosure will perceive various utilitarian combinations, modifications and generalizations of the features and characteristics of the embodiments so described. For example, steps in methods described herein may generally be performed in any order, and some steps may be omitted, while other steps may be added, except where the context clearly indicates otherwise. Similarly, components in structures described herein may be arranged in different positions or locations, and some components may be omitted, while other components may be added, except where the context clearly indicates otherwise. The scope of the disclosure is intended to include all such combinations, modifications, and generalizations as well as their equivalents.

Example Embodiments

Example embodiments include at least the following:
1. A computer-implemented method for generating an image of a subsurface earth volume, comprising: (a) accessing signals recorded from sensors that were disposed in a body of water in the presence of acoustic energy that was emitted in the body of water by a passive source during a marine seismic survey; (b) identifying a point to represent a location from which the acoustic energy was emitted; (c) isolating, from the recorded signals, a direct wavefield arriving at the sensors from a direction of the identified point; (d) generating an estimated passive source wavefield at the identified point by backpropagating the isolated direct wavefield to the identified point; (e) based on the estimated passive source wavefield and on the recorded signals, generating an image of the subsurface earth volume; and (f) recording the image or data representative thereof in a non-transitory computer readable medium.

2. The method of embodiment 1, wherein: identifying the point comprises choosing a location on or near a physical source of passive acoustic energy that was present the body of water during the marine seismic survey.

3. The method of any of the previous embodiments, wherein: identifying the point comprises backpropagating signals recorded from the sensors to a plurality of locations and selecting the point based on signal intensity values corresponding to the plural locations.

4. The method of any of the previous embodiments wherein the recorded signals comprise plural sensor channels, each sensor channel corresponding to a channel location associated with one or more of the sensors, and wherein isolating the direct wavefield comprises: selecting a group of the sensor channels; for each sensor channel in the group, creating a time-shifted sensor channel by applying a time shift to the sensor channel to correct for travel time of acoustic energy traveling between the presumed location of the passive source and the location of the sensor channel; generating filtered sensor channels by removing, from the time-shifted sensor channels, signals that are not time aligned; and reversing the time shifts from the filtered sensor channels.

5. The method of embodiment 4, wherein selecting the group of sensor channels comprises: selecting a subset of the sensor channels such that sensor channels included in the subset exhibit a higher-amplitude direct wave response than do sensor channels not included in the subset.

6. The method of any of embodiments 4 or 5, wherein removing signals that are not time aligned comprises: applying a low pass horizontal wavenumber filter to the time-shifted sensor channels.

7. The method of any of the previous embodiments, wherein backpropagating the isolated direct wavefield comprises: backpropagating velocity signals.

8. The method of any of the previous embodiments, wherein backpropagating the isolated direct wavefield comprises: backpropagating pressure signals.

9. The method of any of the previous embodiments, wherein backpropagating the isolated direct wavefield comprises: backpropagating pressure signals; backpropagating velocity signals; determining a set of per-channel scalar values, each per-channel scalar value accounting for a difference in amplitude response between a velocity channel and a corresponding collocated pressure channel; adjusting the backpropagated velocity signals based on the per-channel scalar values; and averaging the backpropagated pressure signals with the adjusted backpropagated velocity signals.

10. The method of embodiment 9, wherein determining the per-channel scalar values comprises: minimizing a cost function, wherein the cost function is based on differences between backpropagated pressure signals and scalar-adjusted backpropagated velocity signals over a range of frequencies of interest.

11. The method of any of the previous embodiments, wherein generating the estimated passive source wavefield comprises: backpropagating the isolated direct wavefield in a plurality of emission angle ranges such that, for each particular emission angle range, only sensor channels that contribute to the direct wavefield for the particular emission angle range are included in the backpropagation.

12. The method of any of the previous embodiments, wherein generating the image of the subsurface earth volume comprises: deconvolving the estimated passive source wavefield from the recorded signals to generate an impulse response of the subsurface earth volume.

13. The method of any of the previous embodiments, further comprising: designating a plurality of overlapping time windows within a span of time that corresponds to the recorded signals; and performing steps (c) and (d) for each of the time windows such that, for each particular time window, only recorded signals corresponding to the particular time window are used, and such that at least one per-window estimated passive source wavefield is produced.

14. The method of embodiment 13, wherein generating the image of the subsurface earth volume comprises: imaging based on the per-window estimated passive source wavefields individually.

15. The method of any of embodiments 13 or 14, further comprising: combining the per-window estimated passive source wavefields to produce a continuous estimated passive source wavefield corresponding to the span of time.

16. The method of embodiment 15, wherein combining the per-window estimated passive source wavefields comprises: averaging amplitude and location values corresponding to time spans where the per-window estimated passive source wavefields overlap.

17. The method of embodiment 16, wherein averaging the amplitude and location values comprises: applying tapering weights to component samples from earlier and later time windows such that, in a time span where the earlier and the later time windows overlap, decreasing weights are applied to component samples from the earlier time window as time increases, and increasing weights are applied to component samples from the later time window as time increases.

18. The method of embodiment 15, wherein generating the image of the subsurface earth volume comprises: imaging based on the continuous estimated passive source wavefield.

19. The method of any of the previous embodiments: further comprising defining a region that includes multiple possible point source locations; and wherein generating the estimated passive source wavefield comprises identifying one or more point sources located within the region.

20. The method of embodiment 19, wherein identifying the one or more point sources comprises: designating a grid of points within the region; and iteratively scanning the grid of points to identify a single point source with each iteration, and continuing to iterate until no further point sources can be identified.

21. The method of embodiment 20, wherein iteratively scanning the grid points to identify a single point source comprises: (g) for each grid point determining, from a current set of recorded signals, a signal intensity value associated with a direct wave arriving at one or more of the sensors from the grid point; (h) based on results from step (g), identifying a location of a most energetic point within the region, wherein the most energetic point corresponds to a highest signal intensity value among multiple points in the region; (i) generating an estimated source wavefield at the most energetic point by backpropagating the current set of recorded signals to the most energetic point; (j) determining a direct wave contribution from the estimated source wavefield to the current set of recorded signals by forward propagating the estimated source wavefield from the most energetic point to the locations of the one or more sensors; (j) subtracting the contribution from the current set of recorded signals to produce a modified set of recorded signals; (k) determining a signal level reduction in the modified set of recorded signals relative to the current set of recorded signals; and (1) if the determined signal level reduction is above a threshold reduction level, replacing the current set of recorded signals with the modified set of recorded signals and performing another iteration by resuming at step (g).

22. The method of embodiment 19, further comprising: designating a plurality of overlapping time windows within a span of time that corresponds to the recorded signals; and for each of the overlapping time windows, identifying one or more point sources located within the region to produce a per-window set of estimated point source wavefields.

23. The method of embodiment 22, further comprising: combining the per-window sets of estimated point source wavefields to produce a continuous set of estimated passive source wavefields corresponding to the span of time.

24. The method of any of the previous examples, wherein: time shifts and/or travel times are computed by taking into account relative motion between a source and a sensor channel during the time required for acoustic energy to propagate from the source to the sensor channel.

25. A system, comprising: one or more processors and a memory storing instructions that, when executed by the one or more processor, cause the one or more processor to perform a method according to any of embodiments 1 to 24.

26. A non-transitory computer readable medium storing instructions that, if executed by one or more processors, cause the one or more processors to perform a method according to any of embodiments 1 to 24.

27. A method of manufacturing a geophysical data product, comprising: performing a method according to any of embodiments 1 to 24, and storing results therefrom in a non-transitory computer readable medium, thereby completing the manufacture of the geophysical data product.

What is claimed is:

1. A computer-implemented method for generating an image of a subsurface earth volume, comprising:
   (a) accessing signals recorded from sensors that were disposed in a body of water in the presence of acoustic energy that was emitted in the body of water by a passive source during a marine seismic survey;
   (b) identifying a point to represent a location from which the acoustic energy was emitted;
   (c) isolating, from the recorded signals, a direct wavefield arriving at the sensors from a direction of the identified point;
   (d) generating an estimated passive source wavefield at the identified point by backpropagating the isolated direct wavefield to the identified point;
   (e) based on the estimated passive source wavefield and on the recorded signals, generating an image of the subsurface earth volume; and
   (f) recording the image or data representative thereof in a non-transitory computer readable medium.

2. The method of claim 1, wherein:
identifying the point comprises choosing a location on or near a physical source of passive acoustic energy that was present the body of water during the marine seismic survey.

3. The method of claim 1, wherein:
identifying the point comprises backpropagating signals recorded from the sensors to a plurality of locations and selecting the point based on signal intensity values corresponding to the plural locations.

4. The method of claim 1 wherein the recorded signals comprise plural sensor channels, each sensor channel corresponding to a channel location associated with one or more of the sensors, and wherein isolating the direct wavefield comprises:
selecting a group of the sensor channels;
for each sensor channel in the group, creating a time-shifted sensor channel by applying a time shift to the sensor channel to correct for travel time of acoustic energy traveling between the presumed location of the passive source and the location of the sensor channel;
generating filtered sensor channels by removing, from the time-shifted sensor channels, signals that are not time aligned; and
reversing the time shifts from the filtered sensor channels.

5. The method of claim 4, wherein selecting the group of sensor channels comprises:
selecting a subset of the sensor channels such that sensor channels included in the subset exhibit a higher-amplitude direct wave response than do sensor channels not included in the subset.

6. The method of claim 4, wherein removing signals that are not time aligned comprises:
applying a low pass horizontal wavenumber filter to the time-shifted sensor channels.

7. The method of claim 1, wherein backpropagating the isolated direct wavefield comprises:
backpropagating velocity signals.

8. The method of claim 1, wherein backpropagating the isolated direct wavefield comprises:
backpropagating pressure signals.

9. The method of claim 1, wherein backpropagating the isolated direct wavefield comprises:
backpropagating pressure signals;
backpropagating velocity signals;
determining a set of per-channel scalar values, each per-channel scalar value accounting for a difference in amplitude response between a velocity channel and a corresponding collocated pressure channel;
adjusting the backpropagated velocity signals based on the per-channel scalar values; and
averaging the backpropagated pressure signals with the adjusted backpropagated velocity signals.

10. The method of claim 9, wherein determining the per-channel scalar values comprises:
minimizing a cost function, wherein the cost function is based on differences between backpropagated pressure signals and scalar-adjusted backpropagated velocity signals over a range of frequencies of interest.

11. The method of claim 1, wherein generating the estimated passive source wavefield comprises:
backpropagating the isolated direct wavefield in a plurality of emission angle ranges such that, for each particular emission angle range, only sensor channels that contribute to the direct wavefield for the particular emission angle range are included in the backpropagation.

12. The method of claim 1, wherein generating the image of the subsurface earth volume comprises:
deconvolving the estimated passive source wavefield from the recorded signals to generate an impulse response of the subsurface earth volume.

13. The method of claim 1, further comprising:
designating a plurality of overlapping time windows within a span of time that corresponds to the recorded signals; and
performing steps (c) and (d) for each of the time windows such that, for each particular time window, only recorded signals corresponding to the particular time window are used, and such that at least one per-window estimated passive source wavefield is produced.

14. The method of claim 13, wherein generating the image of the subsurface earth volume comprises:
imaging based on the per-window estimated passive source wavefields individually.

15. The method of claim 13, further comprising:
combining the per-window estimated passive source wavefields to produce a continuous estimated passive source wavefield corresponding to the span of time.

16. The method of claim 15, wherein combining the per-window estimated passive source wavefields comprises:
averaging amplitude and location values corresponding to time spans where the per-window estimated passive source wavefields overlap.

17. The method of claim 16, wherein averaging the amplitude and location values comprises:
applying tapering weights to component samples from earlier and later time windows such that, in a time span where the earlier and the later time windows overlap, decreasing weights are applied to component samples from the earlier time window as time increases, and increasing weights are applied to component samples from the later time window as time increases.

18. The method of claim 15, wherein generating the image of the subsurface earth volume comprises:
imaging based on the continuous estimated passive source wavefield.

19. The method of claim 1:
further comprising defining a region that includes multiple possible point source locations; and
wherein generating the estimated passive source wavefield comprises identifying one or more point sources located within the region.

20. The method of claim 19, wherein identifying the one or more point sources comprises:
designating a grid of points within the region; and
iteratively scanning the grid of points to identify a single point source with each iteration, and continuing to iterate until no further point sources can be identified.

21. The method of claim 20, wherein iteratively scanning the grid points to identify a single point source comprises:
(g) for each grid point determining, from a current set of recorded signals, a signal intensity value associated with a direct wave arriving at one or more of the sensors from the grid point;
(h) based on results from step (g), identifying a location of a most energetic point within the region, wherein the most energetic point corresponds to a highest signal intensity value among multiple points in the region;
(i) generating an estimated source wavefield at the most energetic point by backpropagating the current set of recorded signals to the most energetic point;
(i) determining a direct wave contribution from the estimated source wavefield to the current set of recorded signals by forward propagating the estimated source wavefield from the most energetic point to the locations of the one or more sensors;
(j) subtracting the contribution from the current set of recorded signals to produce a modified set of recorded signals;
(k) determining a signal level reduction in the modified set of recorded signals relative to the current set of recorded signals; and
(l) if the determined signal level reduction is above a threshold reduction level, replacing the current set of recorded signals with the modified set of recorded signals and performing another iteration by resuming at step (g).

22. The method of claim 19, further comprising:
designating a plurality of overlapping time windows within a span of time that corresponds to the recorded signals; and
for each of the overlapping time windows, identifying one or more point sources located within the region to produce a per-window set of estimated point source wavefields.

23. The method of claim 22, further comprising:
combining the per-window sets of estimated point source wavefields to produce a continuous set of estimated passive source wavefields corresponding to the span of time.

24. A system comprising one or more processors and a memory coupled to the one or more processors, wherein the memory stores instructions that, when executed by the one or more processors, cause the one or more processors to perform a method of generating an image of a subsurface earth volume, the method comprising:
(a) accessing signals recorded from sensors that were disposed in a body of water in the presence of acoustic energy that was emitted in the body of water by a passive source;
(b) isolating, from the recorded signals, a direct wavefield arriving at the sensors from a direction of a presumed location of the passive source;
(c) generating an estimated passive source wavefield at the presumed location of the passive source by backpropagating the isolated direct wavefield to the presumed location of the passive source;
(d) based on the estimated passive source wavefield and on the recorded signals, generating an image of the subsurface earth volume; and
(e) recording the image or data representative thereof in the, or another, non-transitory computer readable medium.

25. The system of claim 24 wherein the recorded signals comprise plural sensor channels, each sensor channel corresponding to a channel location associated with one or more of the sensors, and wherein isolating the direct wavefield comprises:

selecting a group of the sensor channels such that sensor channels included the subset exhibit a higher-amplitude direct wave response than do sensor channels not included in the sub set;

for each sensor channel in the group, creating a time-shifted sensor channel by applying a time shift to the sensor channel to correct for travel time of acoustic energy traveling between the presumed location of the passive source and the location of the sensor channel;

generating filtered sensor channels by removing, from the time-shifted sensor channels, signals that are not time aligned; and reversing the time shifts from the filtered sensor channels.

26. The system of claim 24, wherein backpropagating the isolated direct wavefield comprises:

backpropagating velocity signals.

27. The system of claim 24, wherein backpropagating the isolated direct wavefield comprises:

backpropagating pressure signals.

28. The system of claim 24, further comprising:

designating a plurality of overlapping time windows within a span of time that corresponds to the recorded signals; and performing steps (b) and (c) for each of the time windows such that, for each particular time window, only recorded signals corresponding to the particular time window are used, and such that at least one per-window estimated passive source wavefield is produced.

29. The system of claim 24:

further comprising defining a region that includes the presumed location of the passive source; and wherein generating the estimated passive source wavefield comprises identifying one or more point sources located within the region.

30. The system of claim 29, wherein identifying the one or more point sources comprises:

designating a grid of points within the region; and iteratively scanning the grid of points to identify a single point source location within the region during each iteration, and iterating until no further point sources can be identified.

31. The system of claim 30, wherein iteratively scanning the grid points to identify a single point source comprises:

(f) for each grid point determining, from a current set of recorded signals, a signal intensity value associated with a direct wave arriving at one or more of the sensors from the grid point;

(g) based on results from step (e), identifying a location of a most energetic point within the region, wherein the most energetic point corresponds to a highest signal intensity value among multiple points in the region;

(h) generating an estimated source wavefield at the most energetic point by backpropagating the current set of recorded signals to the most energetic point;

(i) determining a direct wave contribution from the estimated source wavefield to the current set of recorded signals by forward propagating the estimated source wavefield from the most energetic point to the locations of the one or more sensors;

(j) subtracting the contribution from the current set of recorded signals to produce a modified set of recorded signals;

(k) determining a signal level reduction in the modified set of recorded signals relative to the current set of recorded signals; and (l) if the determined signal level reduction is above a threshold reduction level, replacing the current set of recorded signals with the modified set of recorded signals and performing another iteration by resuming at step (f).

32. The system of claim 29, further comprising:

designating a plurality of overlapping time windows within a span of time that corresponds to the recorded signals; and for each of the overlapping time windows, identifying one or more point sources located within the region to produce a per-window set of estimated point source wavefields.

33. In a computer-implemented method for generating an image of a subsurface earth volume, wherein the method is of the kind in which a computer accesses signals that were previously recorded from marine seismic sensors, and in which the computer processes the accessed signals to produce the image of the subsurface volume, the specific improvement comprising:

(a) accessing signals recorded from sensors that were disposed in a body of water in the presence of acoustic energy that was emitted in the body of water by a passive source;

(b) identifying a point to represent a location from which the acoustic energy was emitted;

(c) isolating, from the recorded signals, a direct wavefield arriving at the sensors from a direction of the identified point;

(d) generating an estimated passive source wavefield at the identified point by backpropagating the isolated direct wavefield to the identified point;

thereby enabling the image of the subsurface volume to be generated based on the estimated passive source wavefield.

34. The method of claim 33 wherein the recorded signals comprise plural sensor channels, each sensor channel corresponding to a channel location associated with one or more of the sensors, and wherein isolating the direct wavefield comprises:

selecting a group of the sensor channels such that sensor channels included the subset exhibit a higher-amplitude direct wave response than do sensor channels not included in the sub set;

for each sensor channel in the group, creating a time-shifted sensor channel by applying a time shift to the sensor channel to correct for travel time of acoustic energy traveling between the presumed location of the passive source and the location of the sensor channel;

generating filtered sensor channels by removing, from the time-shifted sensor channels, signals that are not time aligned; and reversing the time shifts from the filtered sensor channels.

35. The method of claim 33, wherein backpropagating the isolated direct wavefield comprises:

backpropagating velocity signals.

36. The method of claim 33, wherein backpropagating the isolated direct wavefield comprises:

backpropagating pressure signals.

37. The method of claim 33, further comprising:

designating a plurality of overlapping time windows within a span of time that corresponds to the recorded signals; and performing steps (c) and (d) for each of the time windows such that, for each particular time window, only recorded signals corresponding to the particular time window are used, and such that at least one per-window estimated passive source wavefield is produced.

38. The method of claim 33:
further comprising defining a region that includes the presumed location of the passive source; and
wherein generating the estimated passive source wavefield comprises identifying one or more point sources located within the region.

39. The method of claim 38, wherein identifying the one or more point sources comprises:
designating a grid of points within the region; and
iteratively scanning the grid of points to identify a single point source within the region during each iteration, and iterating until no further point sources can be identified.

40. The method of claim 39, wherein iteratively scanning the grid points to identify a single point source comprises:
(e) for each grid point determining, from a current set of recorded signals, a signal intensity value associated with a direct wave arriving at one or more of the sensors from the grid point;
(f) based on results from step (e), identifying a location of a most energetic point within the region, wherein the most energetic point corresponds to a highest signal intensity value among multiple points in the region;
(g) generating an estimated source wavefield at the most energetic point by backpropagating the current set of recorded signals to the most energetic point;
(h) determining a direct wave contribution from the estimated source wavefield to the current set of recorded signals by forward propagating the estimated source wavefield from the most energetic point to the locations of the one or more sensors;
(i) subtracting the contribution from the current set of recorded signals to produce a modified set of recorded signals;
(j) determining a signal level reduction in the modified set of recorded signals relative to the current set of recorded signals; and
(k) if the determined signal level reduction is above a threshold reduction level, replacing the current set of recorded signals with the modified set of recorded signals and performing another iteration by resuming at step (e).

41. The method of claim 38, further comprising:
designating a plurality of overlapping time windows within a span of time that corresponds to the recorded signals; and
for each of the overlapping time windows, identifying one or more point sources located within the region to produce a per-window set of estimated point source wavefields.

42. A non-transitory computer readable medium storing instructions that, when executed by one or more processors, cause the one or more processors to perform a method of generating an image of a subsurface earth volume, the method comprising:
(a) accessing signals recorded from sensors that were disposed in a body of water in the presence of acoustic energy that was emitted in the body of water by a passive source;
(b) isolating, from the recorded signals, a direct wavefield arriving at the sensors from a direction of a presumed location of the passive source;
(c) generating an estimated passive source wavefield at the presumed location of the passive source by backpropagating the isolated direct wavefield to the presumed location of the passive source;
(d) based on the estimated passive source wavefield and on the recorded signals, generating an image of the subsurface earth volume; and
(e) recording the image or data representative thereof in the, or another, non-transitory computer readable medium.

43. The medium of claim 42 wherein the recorded signals comprise plural sensor channels, each sensor channel corresponding to a channel location associated with one or more of the sensors, and wherein isolating the direct wavefield comprises:
selecting a group of the sensor channels such that sensor channels included the subset exhibit a higher-amplitude direct wave response than do sensor channels not included in the sub set;
for each sensor channel in the group, creating a time-shifted sensor channel by applying a time shift to the sensor channel to correct for travel time of acoustic energy traveling between the presumed location of the passive source and the location of the sensor channel;
generating filtered sensor channels by removing, from the time-shifted sensor channels, signals that are not time aligned; and
reversing the time shifts from the filtered sensor channels.

44. The medium of claim 42, wherein backpropagating the isolated direct wavefield comprises:
backpropagating velocity signals.

45. The medium of claim 42, wherein backpropagating the isolated direct wavefield comprises:
backpropagating pressure signals.

46. The medium of claim 42, further comprising:
designating a plurality of overlapping time windows within a span of time that corresponds to the recorded signals; and
performing steps (b) and (c) for each of the time windows such that, for each particular time window, only recorded signals corresponding to the particular time window are used, and such that at least one per-window estimated passive source wavefield is produced.

47. The medium of claim 42:
further comprising defining a region that includes the presumed location of the passive source; and
wherein generating the estimated passive source wavefield comprises identifying one or more point sources located within the region.

48. The medium of claim 47, wherein identifying the one or more point sources comprises:
designating a grid of points within the region; and
iteratively scanning the grid of points to identify a single point source location within the region during each iteration, and iterating until no further point sources can be identified.

49. The medium of claim 48, wherein iteratively scanning the grid points to identify a single point source comprises:
(f) for each grid point determining, from a current set of recorded signals, a signal intensity value associated with a direct wave arriving at one or more of the sensors from the grid point;
(g) based on results from step (e), identifying a location of a most energetic point within the region, wherein the most energetic point corresponds to a highest signal intensity value among multiple points in the region;
(h) generating an estimated source wavefield at the most energetic point by backpropagating the current set of recorded signals to the most energetic point;
(i) determining a direct wave contribution from the estimated source wavefield to the current set of recorded signals by forward propagating the estimated source wavefield from the most energetic point to the locations of the one or more sensors;

(j) subtracting the contribution from the current set of recorded signals to produce a modified set of recorded signals;

(k) determining a signal level reduction in the modified set of recorded signals relative to the current set of recorded signals; and (l) if the determined signal level reduction is above a threshold reduction level, replacing the current set of recorded signals with the modified set of recorded signals and performing another iteration by resuming at step (f).

50. The medium of claim 47, further comprising:

designating a plurality of overlapping time windows within a span of time that corresponds to the recorded signals; and for each of the overlapping time windows, identifying one or more point sources located within the region to produce a per-window set of estimated point source wavefields.

\* \* \* \* \*